United States Patent
Scanlon et al.

(10) Patent No.: US 9,900,556 B1
(45) Date of Patent: Feb. 20, 2018

(54) SYSTEMS AND METHODS FOR VIRTUAL CO-LOCATION

(71) Applicant: The Travelers Indemnity Company, Hartford, CT (US)

(72) Inventors: Ryan M. Scanlon, East Hampton, CT (US); Douglas L. Roy, Plantsville, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 15/660,012

(22) Filed: Jul. 26, 2017

Related U.S. Application Data

(60) Provisional application No. 62/525,741, filed on Jun. 28, 2017.

(51) Int. Cl.
*H04N 7/15* (2006.01)
*H04N 7/14* (2006.01)

(52) U.S. Cl.
CPC ............. *H04N 7/157* (2013.01); *H04N 7/142* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,697,822 B1* | 7/2017 | Naik | ...................... | G10L 15/063 |
| 2012/0249013 A1* | 10/2012 | Valois | ................ | H05B 37/0227 |
| | | | | 315/291 |
| 2014/0222436 A1* | 8/2014 | Binder | .................... | G06F 3/167 |
| | | | | 704/275 |
| 2015/0243144 A1* | 8/2015 | Cantave | ............. | G08B 13/2491 |
| | | | | 340/541 |
| 2017/0105080 A1* | 4/2017 | Das | ........................ | H04R 29/00 |

* cited by examiner

*Primary Examiner* — Joseph J Nguyen
(74) *Attorney, Agent, or Firm* — Fincham Downs LLC; Carson C.K. Fincham

(57) ABSTRACT

Systems and methods for facilitating collaboration between a local user or team in a meeting space and one or more remote users outside the meeting space are provided. The virtual co-location system may include, for example, an IOT device including sensors, a microphone, a beacon light, a speaker, a user control interface (e.g., including a control input adjusted by the local user, the user control interface producing an electronic control signal representing a setting of a control device), and/or a local microprocessor for executing local collaboration software. The virtual co-location systems and methods may also or alternatively include a remote computer having a remote microprocessor for executing remote collaboration software.

18 Claims, 10 Drawing Sheets

Copyright © 2017 The Travelers Indemnity Company

SYSTEMS AND METHODS FOR VIRTUAL CO-LOCATION

CROSS-REFERENCE TO RELATED APPLICATIONS

This application claims benefit and priority under 35 U.S.C. § 119(e) to U.S. Provisional Application No. 62/525,741, filed on Jun. 28, 2017 and titled "SYSTEMS AND METHODS FOR VIRTUAL CO-LOCATION", which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present disclosure relates generally to systems and methods for providing virtual co-location and, more specifically, to systems and methods for virtual co-location for facilitating collaboration between a local user in a room and a remote user outside the room, including for example, an Internet Of Things (IOT) device and a remote computer.

It is often the case that the best collaboration among teams occurs when all team members are in the same "pod" or room at the same time. However, in today's workplace environment, it is not unusual to have some people working remotely at any given time. Working remotely includes working from any location other than a shared space conducive to face-to-face meetings, including working from home and working at another company facility.

Many attempts have been made to use telecommunications technology to overcome the impact on collaboration of working remotely. However, even in today's digital workplace, collaborating team members physically located outside of a central location, such as a main office, still do not fully enjoy the benefits of in-person collaboration. While diverse physical locations may be convenient or even necessary, collaboration efforts as a whole often suffer. For example, many aspects of spontaneous collaboration are lost when collaborating workers are in different physical locations. When spontaneous collaboration does occur, there is no easy way for a remote worker to jump into that discussion. Even if a teleconference is hastily arranged, remote workers often cannot communicate non-verbally and the remote worker(s) may not even know who is in the room or participating.

SUMMARY

In some embodiments, systems and methods are provided for virtual co-location for facilitating collaboration between a local user in a room and a remote user outside the room, utilizing, for example, an IOT device and a remote computer. According to some embodiments, the systems and methods may provide one or more remote users opportunities for collaboration with a local user (and/or team of users).

In some embodiments, the virtual co-location system may include an IOT device comprising a sound sensor configured to detect different sound levels in a room to detect an ambient sound level and produce an electronic sound signal representing the ambient sound level, a light sensor configured to detect different light levels in the room to detect an ambient light level and produce an electronic light signal representing the ambient light level, a microphone, a beacon light, a speaker, a user control interface (e.g., an I/O device, such as a touchscreen) comprising a control input adjusted by the local user, the user control interface producing an electronic control signal representing a setting of a control device, and a local microprocessor for executing local collaboration software. In some embodiments, the local collaboration software causes the electronic sound signal, the electronic light signal, and the electronic control signal to be received and stored. In further embodiments, at least one of the electronic sound signal, a signal indicating an absence of sound at or beyond an audio threshold, and a signal indicating a presence of sound at or beyond the audio threshold may be transmitted the remote user, and at least one of the electronic light signal, a signal indicating an absence of light at or beyond an illumination threshold, and a signal indicating a presence of light at or beyond the illumination threshold may be transmitted to the remote user. In other embodiments, the local collaboration software receives a hand raise signal from the remote user and causes at least one of the beacon light to be illuminated and the speaker to produce a sound. In further embodiments, the virtual co-location system also includes a remote computer having a remote microprocessor for executing remote collaboration software to receive and store at least one of the electronic sound signal, the signal indicating the absence of sound at or beyond an audio threshold, and the signal indicating the presence of sound at or beyond the audio threshold, and at least one of the electronic light signal, the signal indicating the absence of light at or beyond an illumination threshold, and the signal indicating a presence of light at or beyond the illumination threshold. In some embodiments, the remote collaboration software transmits the hand raise signal from the remote computer to the IOT device.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

The following description and drawings are illustrative and are not to be construed as limiting. Numerous specific details are described to provide a thorough understanding of the disclosure. However, in certain instances, well known or conventional details are not described in order to avoid obscuring the description.

Reference in this specification to "one embodiment," "an embodiment," "some embodiments," or the like, means that a particular feature, structure, characteristic, advantage or benefit described in connection with the embodiment is included in at least one embodiment of the disclosure, but may not be exhibited by other embodiments. The appearances of the phrase "in one embodiment" in various places in the specification are not necessarily all referring to the same embodiment, nor are separate or alternative embodiments mutually exclusive of other embodiments. Similarly, various requirements are described which may be requirements for some embodiments but not for other embodiments. The specification and drawings are to be regarded in an illustrative sense rather than a restrictive sense. Various modifications may be made thereto without departing from the scope as set forth in the claims.

In some embodiments, the systems and methods described in detail herein provide a virtual co-location system for facilitating collaboration between a local user in a room and a remote user outside the room, e.g., including an IOT device that includes a sound sensor, a light sensor, a microphone, a beacon light, a speaker, a user control interface, and a local microprocessor for executing local collaboration software for communication with a remote computer.

Embodiments described herein are descriptive of systems, apparatus, methods, interfaces, and articles of manufacture for virtual co-location. An in-room "local" device may, for example, accept input and provide output serving as a "proxy" for a remote worker's presence in the room. The in-room device (e.g., an IOT device) may, in some embodiments, comprise a prominent "beacon" or other alert device that serves as an indication in the room of input received from the remote worker (e.g., as input via the remote worker's electronic device). In such a manner, for example, the remote worker (or workers or other remote users) may initiate a virtual "hand raise" to alert those in the room regarding the remote worker/user. In some embodiments, the local device may comprise a telepresence device comprising two-way voice and image (and/or video) communications, as well as at least one prominent output feature to supplement voice and image communications. The prominent output feature may be utilized, for example, to attract attention during spirited discussions so that the remote worker is better equipped to attract local users' attention and/or to provide a convenient mechanism via which the remote worker (or a plurality of remote workers) may vote on an issue or resolution (e.g., a vote tally indicator).

Figure 1:
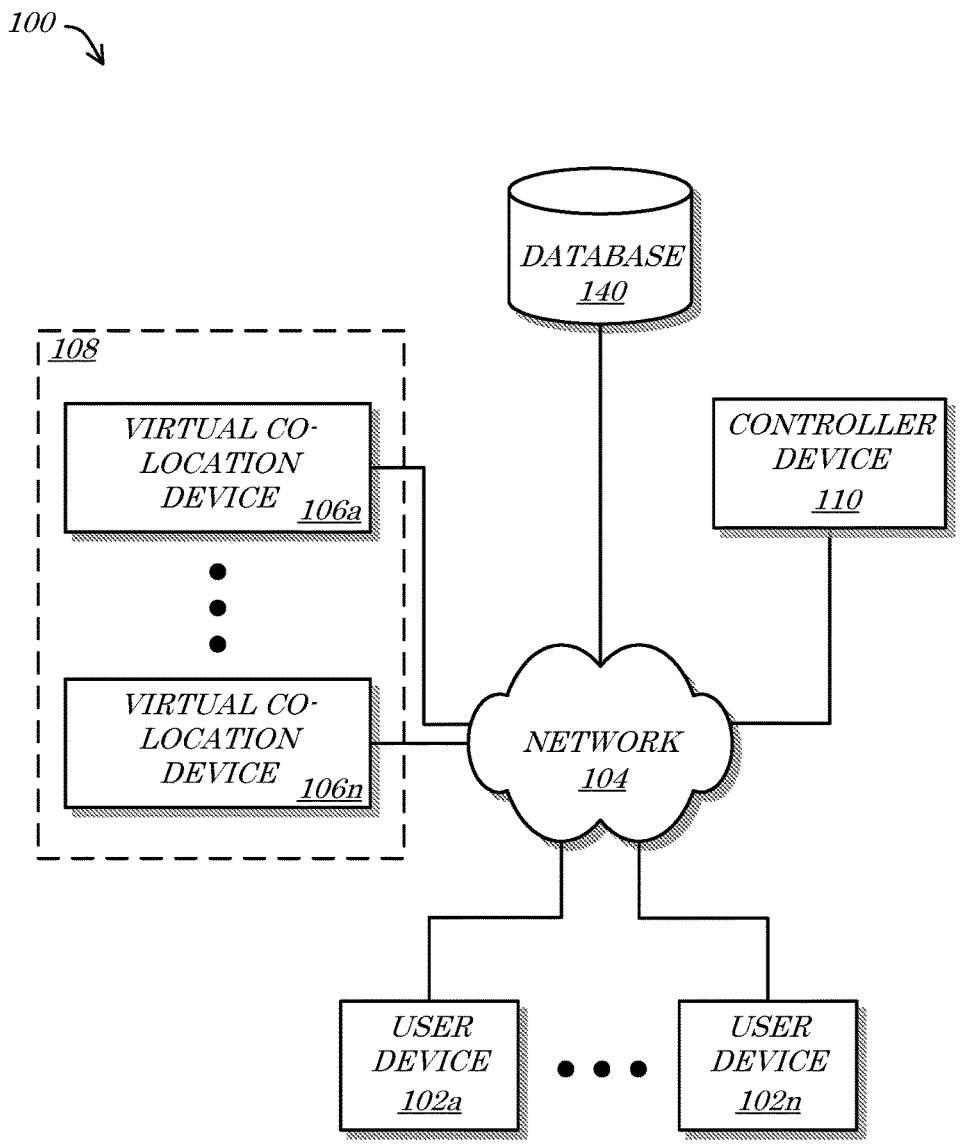
FIG. 1 is a block diagram of a system according to some embodiments.

Referring first to FIG. 1, a block diagram of a system 100 according to some embodiments is shown. In some embodiments, the system 100 may comprise a plurality of user devices 102a-n, a network 104, a plurality of virtual co-location devices 106a-n (e.g., disposed at a meeting location 108, such as a conference room), a controller device 110, and/or a database 140. As depicted in FIG. 1, any or all of the components 102a-n, 106a-n, 108, 110, 140 (or any combinations thereof) may be in communication via the network 104. In some embodiments, the system 100 may be utilized to provide virtual co-location functionality—e.g., allowing one or more remote users (not shown) of the user devices 102a-n to more fully integrate with deliberations ongoing at the meeting location 108). One or more of the virtual co-location devices 106a-n may, for example, interface with one or more of the user devices 102a-n and/or the controller device 110 to provide visual and/or audio indications of input provided by the user devices 102a-n, at the meeting location 108. In some embodiments, such visual and/or audio indications may be supplemental to visual and/or audio communications output as part of a conversation (e.g., voice and facial images/video).

Fewer or more components 102a-n, 104, 106a-n, 108, 110, 140 and/or various configurations of the depicted components 102a-n, 104, 106a-n, 108, 110, 140 may be included in the system 100 without deviating from the scope of embodiments described herein. In some embodiments, the components 102a-n, 104, 106a-n, 108, 110, 140 may be similar in configuration and/or functionality to similarly named and/or numbered components as described herein. In some embodiments, the system 100 (and/or portion thereof) may comprise a virtual co-location program, system, and/or platform programmed and/or otherwise configured to execute, conduct, and/or facilitate the systemic method 500 of FIG. 5 herein, and/or portions thereof.

The user devices 102a-n, in some embodiments, may comprise any types or configurations of computing, mobile electronic, network, user, and/or communication devices that are or become known or practicable. The user devices 102a-n may, for example, comprise one or more tablet computers such as an iPad® manufactured by Apple®, Inc. of Cupertino, Calif., and/or cellular and/or wireless telephones or "smart" phones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, the user devices 102a-n may comprise devices owned and/or operated by one or more users, such as a remote employee, worker, and/or other user. According to some embodiments, the user devices 102a-n may communicate with the controller device 110 via the network 104 to execute a virtual co-location application (or a portion thereof), as described herein. According to some embodiments, the user devices 102a-n may store and/or execute specially programmed instructions (such as a mobile device virtual co-location application) to operate in accordance with embodiments described herein. The user devices 102a-n may, for example, execute one or more virtual co-location programs that communicate with one or more of the virtual co-location devices 106a-n (directly or via the controller device 110) situated at or in the meeting location 108, which may be remote from the particular user device(s) 102a-n utilized.

In some embodiments, the user devices 102a-n may interface with the controller device 110 to effectuate communications (direct or indirect) with one or more other user devices 102a-n (such communication not explicitly shown in FIG. 1) operated by other users. In some embodiments, the user devices 102a-n may interface with the controller device 110 to effectuate communications (direct or indirect) with one or more of the virtual co-location devices 106a-n (such communication also not explicitly shown in FIG. 1). In some embodiments, the virtual co-location devices 106a-n may transmit and/or broadcast status information descriptive of a current status of the meeting location 108, such as whether the meeting location 108 is occupied, how many people are at/in the meeting location 108, etc. According to some embodiments, the virtual co-location devices 106a-n may utilize one or more beacons (lights, speakers) in addition to standard voice/image/video communication devices to output special indications from the user devices 102a-n, such as virtual "hand raises", vote tallies, participant status, etc.

The network 104 may, according to some embodiments, comprise a Local Area Network (LAN; wireless and/or wired), cellular telephone, Bluetooth® and/or Bluetooth® Low-Energy (BLE), Near Field Communication (NFC), and/or Radio Frequency (RF) network with communication links between the controller device 110, the user devices 102*a*-*n*, the virtual co-location devices 106*a*-*n*, and/or the database 140. In some embodiments, the network 104 may comprise direct communications links between any or all of the components 102*a*-*n*, 106*a*-*n*, 110, 140 of the system 100. The user devices 102*a*-*n* may, for example, be directly interfaced or connected to one or more of the controller device 110 and/or the virtual co-location devices 106*a*-*n* via one or more wires, cables, wireless links, and/or other network components, such network components (e.g., communication links) comprising portions of the network 104. In some embodiments, the network 104 may comprise one or many other links or network components other than those depicted in FIG. 1. The user devices 102*a*-*n* may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a*-*n*, 106*a*-*n*, 110, 140 of the system 100. The network 104 may comprise one or more cellular telephone networks with communication links between the user devices 102*a*-*n* and the controller device 110, for example, and/or may comprise a BLE, NFC, and/or "personal" network comprising wireless communications between the virtual co-location devices 106*a*-*n* and the user devices 102*a*-*n* and/or controller device 110, for example.

The virtual co-location devices 106*a*-*n*, in some embodiments, may comprise any type or configuration of devices that include various sensors, input devices, output devices, I/O devices, communication devices, and/or specialized indication devices (e.g., a beacon) that are or become known or practicable. In some embodiments, the virtual co-location devices 106*a*-*n* comprise telecommunication and/or telepresence devices that allow two-way voice/image/video communications for remote collaboration—e.g., a video conference. According to some embodiments, the virtual co-location devices 106*a*-*n* may also comprise specialized indication devices such as a light beacon, LED display, speaker, noise maker (e.g., a piezo-electric buzzer), etc., which may be utilized to allow a remote user, via one of the user devices 102*a*-*n*, to indicate a virtual "hand raise", a vote, and/or other virtual co-location status indication.

In some embodiments, the controller device 110 may comprise an electronic and/or computerized controller device, such as a computer server communicatively coupled to interface with the user devices 102*a*-*n* (directly and/or indirectly) and/or the virtual co-location devices 106*a*-*n*. The controller device 110 may, for example, comprise one or more PowerEdge™ M910 blade servers manufactured by Dell®, Inc. of Round Rock, Tex., which may include one or more Eight-Core Intel® Xeon® 7500 Series electronic processing devices. According to some embodiments, the controller device 110 may be located remote from one or more of the user devices 102*a*-*n*, the virtual co-location devices 106*a*-*n*, and/or the meeting location 108. The controller device 110 may also or alternatively comprise a plurality of electronic processing devices located at one or more various sites and/or locations (e.g., other than the meeting location 108). In some embodiments, the virtual co-location devices 106*a*-*n* may operate in accordance with logic, rules, thresholds, triggers, and/or instructions stored in and/or accessible via the database 140.

According to some embodiments, the controller device 110 may store and/or execute specially programmed instructions to operate in accordance with embodiments described herein. The controller device 110 may, for example, execute one or more programs that facilitate and/or cause the provision of virtual co-location functionality as described herein. According to some embodiments, the controller device 110 may comprise a computerized processing device, such as a PC, laptop computer, computer server, and/or other network or electronic device to manage the virtual co-location of a user (not shown) of a first user device 102*a* at the meeting location 108 via a first one of the virtual co-location devices 106*a*.

In some embodiments, the controller device 110, the virtual co-location devices 106*a*-*n*, and/or the user devices 102*a*-*n* may be in communication with the database 140. The database 140 may store, for example, rules, logic, login information, security credentials, protocols, and/or instructions that cause various devices (e.g., the controller device 110, the virtual co-location devices 106*a*-*n*, the and/or the user devices 102*a*-*n*) to operate in accordance with embodiments described herein. In some embodiments, the database 140 may comprise any type, configuration, and/or quantity of data storage devices that are or become known or practicable. The database 140 may, for example, comprise an array of optical and/or solid-state hard drives configured to store user identifiers, device identifiers, status data, and/or virtual co-location signals provided by (and/or requested by) the user devices 102*a*-n and/or the controller device 110, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the user devices 102*a*-*n*, the virtual co-location devices 106*a*-*n*, or the controller device 110 may comprise the database 140 or a portion thereof, for example.

Figure 2:
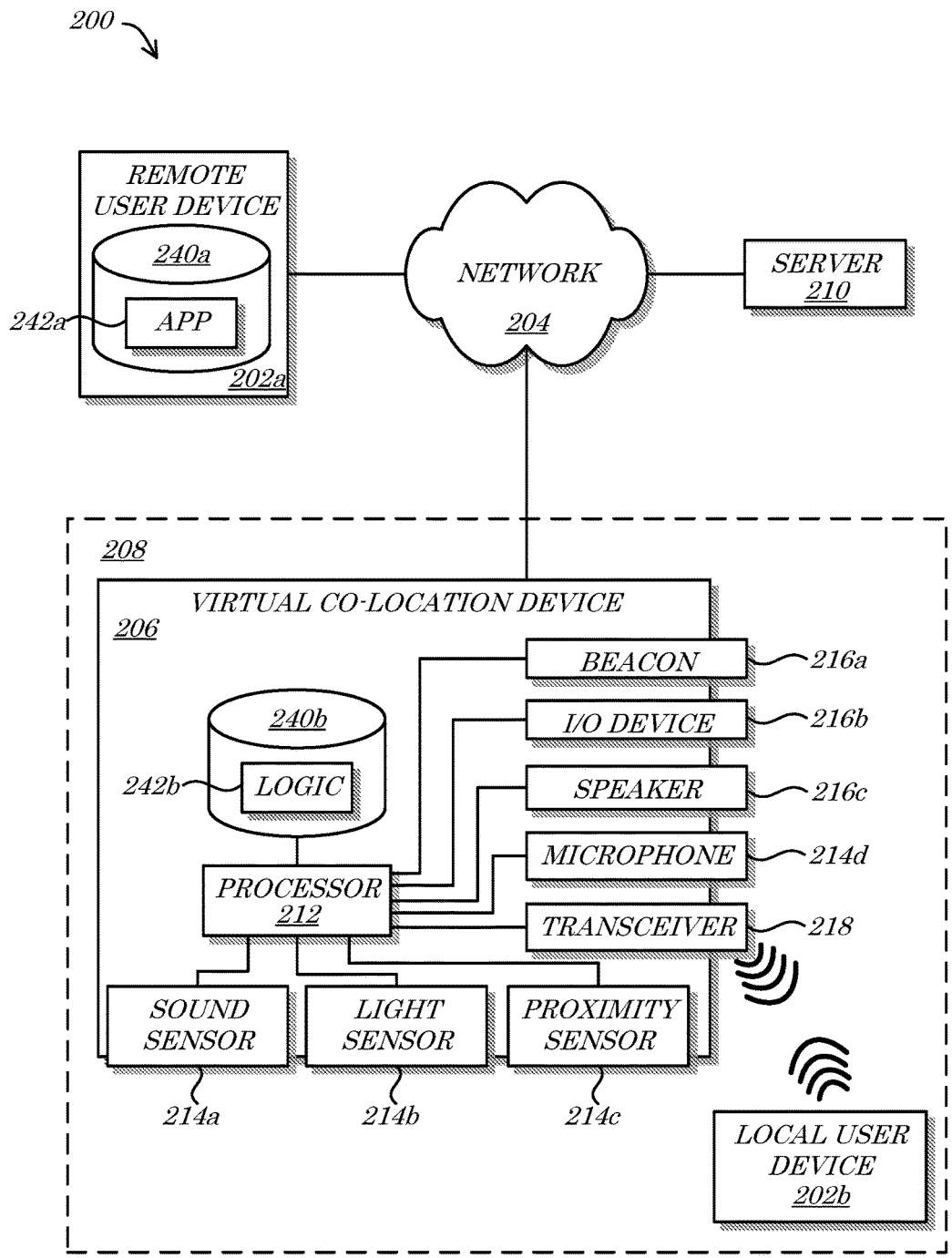
FIG. 2 is a block diagram of a system according to some embodiments.

Referring now to FIG. 2, a block diagram of system 200 according to some embodiments is shown. In some embodiments, the system 200 may comprise a remote user device 202*a* and/or a local user device 202*b* in communication, e.g., via a network 204, with a virtual co-location device 206 disposed within and/or situated at a first, "local", or meeting location 208. In some embodiments, the virtual co-location device 206 and/or the user devices 202*a*-*b* may be in communication with (e.g., via the network 204) a server 210.

According to some embodiments, the virtual co-location device 206 may comprise a processor 212 in communication with and/or in control of a sound sensor 214*a*, a light sensor 214*b*, a proximity sensor 214*c*, a microphone 214*d*, a beacon 216*a*, an I/O device 216*b*, a speaker 216*c*, and/or a communication device (e.g., transceiver) 218. In some embodiments, the sound sensor 214*a* may be configured to detect sounds associated with the presence of people at the meeting location 208 (e.g., in the room). According to some embodiments, the sound sensor 214*a* may comprise an omnidirectional microphone with sufficient gain to detect human voices, for example, the voices of workers collaborating in the room of the meeting location 208 (e.g., in the case that the meeting location 208 comprises a room). In some embodiments, the proximity sensor 214c may comprise a Passive Infrared Radiation (PIR), optical, microwave, and/or acoustic motion sensor operable to detect movement and/or proximity (e.g., presence) within the meeting location 208.

According to some embodiments, the remote user device 202a may comprise a first memory 240a and/or the virtual co-location device 206 may comprise a second memory 240b. The first memory 240a of the remote user device 202a may store, for example, a first program or set of instructions, such as a mobile device or client-side application or "app" 242a. In some embodiments, the second memory 240b of the virtual co-location device 206 may store a second program or set of instructions, which may define various rules, thresholds, and/or logic 242b. According to some embodiments, the logic 242b may cause the processor 212 to take action in response to signals received from any or all of the sound sensor 214a, the light sensor 214b, the proximity sensor 214c, the microphone 214d, the I/O device 216b, and/or the communication device (e.g., transceiver) 218.

In some embodiments for example, the logic 242b may cause the processor 212 to produce, generate, and/or transmit one or more signals in response to received inputs. The logic 242b may cause, in some embodiments, the processor 212 to produce a first signal defining a first state indicating an absence of sound due to detected sound (i.e., sound detected by the sound sensor 214a) being at or below a predefined audio threshold and/or a second signal defining a second state indicating a presence of detected sound that is above the predefined audio threshold. Such signals may, in some embodiments, be transmitted by the virtual co-location device 206, through the network 204 and to the remote user device 202a. According to some embodiments, the app 242a may cause the remote user device 202a to generate and/or output an indication (e.g., via a GUI, not shown in FIG. 2; such as the interfaces 420a-b of FIG. 4A and/or FIG. 4B herein), e.g., based at least in part on the signal and/or the audio threshold, indicative of whether or not there appears to be collaboration by workers in the room (e.g., detected volume levels and/or duration of volume levels (audio signature) over the threshold may indicate an ongoing discussion or collaboration). In such a manner, for example, the virtual co-location device 206 may provide the remote user device 202a with a "Room Empty", "Room is Quiet", "Collaboration is Ongoing", and/or "Room Occupied" notification. In some embodiments, the predefined audio threshold may be adjustable via input received from the remote user device 202a, the remote user device 202b, and/or the I/O device 216b. In some embodiments, the sound sensor 214a may sense, record, and/or "pick up" audio associated with one or more workers speaking at the meeting location 208 and the virtual co-location device 206 may transmit a digitized and/or packetized electronic audio stream using Voice-over Internet Protocol (VoIP) to the remote user device 202a.

In some embodiments, the light sensor 214b may be configured to detect light associated with the presence of people in the meeting location/room 208. In some embodiments, the light sensor 214b may comprise a photodiode with sufficient gain to detect active office lighting, for example, a light turned on automatically or by workers in the room of the meeting location 208. In some embodiments, the logic 242b may cause the processor 212 to produce a third signal (or first light signal) defining a third state (or a first light state) indicating an absence of light (i.e., light detected by the light sensor 214b) below a predefined illumination threshold and/or a fourth signal (or second light signal) defining a fourth state (or second light state) indicating a presence of light at or above the illumination threshold. Such signals may, in some embodiments, be transmitted by the virtual co-location device 206, through the network 204 and to the remote user device 202a. According to some embodiments, the app 242a may cause the remote user device 202a to generate and/or output an indication (e.g., via a GUI, not shown in FIG. 2; such as the interfaces 420a-b of FIG. 4A and/or FIG. 4B herein), e.g., based at least in part on the signal and/or the illumination threshold, indicative of whether or not there appear to be workers in the room (e.g., detected light levels and/or duration of light levels (light signature) over the threshold may indicate movements of an ongoing discussion or collaboration). In some embodiments, the illumination/light signals may be utilized to provide a "Room Empty" or "Room Occupied" notification to the remote user device 202a. According to some embodiments, such a notification may be provided separately from any other notification. In some embodiments, the illumination/light signal may be utilized and/or provided in combination with one or more detected sound levels and/or notifications to provide a "Room Empty" or "Room Occupied" notification. A "Room Empty" notification or state may require, for example, that each of the light and sound levels be detected or maintained below respective thresholds. In some embodiments, the predefined illumination threshold may be adjustable via input received from the remote user device 202a, the remote user device 202b, and/or the I/O device 216b.

According to some embodiments, the proximity sensor 214c may be configured to detect movement or presence indicative of people in the meeting location/room 208. In some embodiments, the proximity sensor 214c may comprise a dual mode PIR and microwave or ultrasonic device configured to detect movement and/or heat signatures of workers in the room of the meeting location 208. In some embodiments, the logic 242b may cause the processor 212 to produce a fifth signal (or first proximity signal) defining a fifth state (or a first proximity state) indicating an absence of movement/heat/mass (i.e., movement/heat/mass detected by the proximity sensor 214c) below a predefined proximity threshold and/or a sixth signal (or second proximity signal) defining a sixth state (or second proximity state) indicating a presence of movement/heat/mass at or above the proximity threshold. Such signals may, in some embodiments, be transmitted by the virtual co-location device 206, through the network 204 and to the remote user device 202a. According to some embodiments, the app 242a may cause the remote user device 202a to generate and/or output an indication (e.g., via a GUI, not shown in FIG. 2; such as the interfaces 420a-b of FIG. 4A and/or FIG. 4B herein), e.g., based at least in part on the proximity signal and/or the proximity threshold, indicative of whether or not there appear to be workers in the room (e.g., detected motion/heat/mass levels and/or duration of motion/heat/mass levels (proximity signature) over the threshold may indicate movements/presence of an ongoing discussion or collaboration). In some embodiments, the proximity signals may be utilized to provide a "Room Empty" or "Room Occupied" notification to the remote user device 202a. According to some embodiments, such a notification may be provided separately from any other notification. In some embodiments, the proximity signal may be utilized and/or provided in combination with one or more detected sound and/or or light levels and/or notifications to provide a "Room Empty" or "Room Occupied" notification. A "Room Empty" notification or state may require, for example, that each of the light, sound, and proximity levels be detected or maintained below respective thresholds. In some embodiments, the predefined proximity threshold may be adjustable via input received from the remote user device 202a, the remote user device 202b, and/or the I/O device 216b.

In some embodiments, the beacon 216a may be configured to be activated by the remote user device 202a, e.g., for getting the attention of one or more workers in the room of the meeting location 208. The beacon 216a may, for example, be activated by the app 242a (e.g., a client software application) executing on the remote user device 202a in response to input from the remote user thereof. The remote user device 202a may, in some embodiments, send a signal indicative of a desire to cause a virtual "hand raise" to the virtual co-location device 206, for example, and the signal may cause the processor 212 (e.g., via execution of the logic 242b) to activate the beacon 216a. In such a manner, even while standard communications such as a teleconference and/or video conference are ongoing via the virtual co-location device 206, the beacon 216a may cause special attention to be directed to the remote worker who may otherwise be overlooked or ignored due to lack of actual physical presence at the meeting location 208.

According to some embodiments, the speaker 216c may produce (e.g., in response to an execution of the logic 242b by the processor 212) an announcement sound to provide an audio cue of occurrence of an event and/or may provide voice data received from the remote user device 202a (e.g., standard voice/video conferencing sound/voice). For example, in some embodiments, the speaker 216c may produce, generate, and/or output a buzzer-type sound to indicate activation by the remote user device 202a of the virtual co-location device 206. In some embodiments, the speaker 216c may produce, generate, and/or output audio playback, such as verbal commentary from the remote user device 202a. In some embodiments, audio playback through the speaker 216c may be enabled with a Universal Serial Bus (USB)-compatible sound card.

In some embodiments, the I/O device 216b may be electrically coupled to receive input from a local user via a control input panel, knob, button, and/or touch-screen interface component (no one of which are separately depicted). The I/O device 216b may produce, generate, and/or output, for example, at least one electronic control signal representing a setting of the control input panel, button, switch, knob, etc. In some embodiments, the I/O device 216b may include a display and/or touchscreen device, such as a two (2)-line Red-Green-Blue (RGB) backlit Liquid Crystal Diode (LCD) display. In some embodiments, the I/O device 216b may include a rotary encoder knob and two (2) button sensors for receiving input entered by hand by a local user. In some embodiments, the I/O device 216b is adjusted by the local user and the I/O device 216b produces, generates, and/or outputs (e.g., in response to a receiving of the input) an electronic control signal representing a setting of the I/O device 216b and/or the virtual co-location device 206 (e.g., a request for a vote and/or a setting of a sound, light, and/or proximity threshold). In some embodiments, the I/O device 216b displays output that reflects the setting of the I/O device 216b (and/or the virtual co-location device 206) and provides visual confirmation to the local user(s) of the settings, thereby enabling navigation through installed software through the I/O device 216b.

In some embodiments, the processor 212 may be configured and/or coupled for executing instructions (e.g., the logic 242b) and controlling input/output signals with respect to the virtual co-location device 206, as described herein. In some embodiments, the processor 212 may comprise and/or be part of a computer board (not separately depicted), e.g., a Central Processing Unit (CPU) mounted or formed on a Printed Circuit Bboard (PCB). In some embodiments, the computer board may comprise an Intel® Edison Compute Module, produced by Intel Corporation, 2200 Mission College Boulevard, Santa Clara, Calif. 95054. In some embodiments, the CPU on the Intel® Edison Compute Module may comprise a dual-core Intel® Atom™ processor with a clock speed of five hundred (500) megahertz (MHz) configured to execute instructions (e.g., the logic 242b) in at least one of the C/C++, Python™, Node.js, HTML5, and JavaScript™ programming languages. In some embodiments, the processor 212 may be Arduino-compatible and/or may be electrically coupled with an Arduino Breakout Board produced by Intel® for I/O communications. In some embodiments, the Arduino Breakout Board may be electrically coupled to a Base Shield V2 produced by Seed Development Limited, F5, Building 8, Shiling Industrial Park, Xinwei, Number 32, Tongsha Road Xili Town, Nanshan District, Shenzhen, 518055 China, for I/O & sensor connectivity.

In some embodiments, the processor 212 and/or the virtual co-location device 206 may be electrically coupled and/or in communication with the local user device 202b, e.g., operated by a local user (not depicted). In some embodiments, the local user device 202b and/or the local user is present in the meeting location/room 208. The local user device 202b may, in some embodiments, communicate wirelessly with the virtual co-location device 206 via the transceiver 218. According to some embodiments, the transceiver 218 may comprise a short-range wireless communications device, such as an RF, IR, NFC, and/or BLE device. In some embodiments, the local user and/or local user device 202b has administrator privileges for accessing the virtual co-location device 206, including the privilege of adjusting various settings and parameters associated with the virtual co-location device 206 (e.g., threshold, preference, and/or other settings).

In some embodiments, the virtual co-location device 206 may be configured to be always operating, similar to a thermostat or a refrigerator. An operating state of the virtual co-location device 206 may, in some embodiments, be maintained through Message Queue Telemetry Transport (MQTT) communication with an Amazon® Web Services (AWS) IOT offering executed on the server 210 and available from Amazon.com®, Inc., 410 Terry Avenue North, Seattle, Wash. 98109. In some embodiments, the virtual co-location device 206 pushes data through MQTT communication to a cloud service provided by AWS on or via the server 210. The cloud service may perform various rules and send notifications back to a "thick" windows client (e.g., the logic 242b) executing on the processor 212 in the virtual co-location device 206. The virtual co-location device 206 may transmit, in some embodiments, state data back to the cloud service/server 210. According to some embodiments, the remote user device 202a receives alerts by executing a .NET thick client software application (e.g., the app 242a) as the local collaboration software and setting the state of the virtual co-location device 206 via HyperText Transfer Protocol (HTTP) posts to the AWS IOT "thing shadow" (e.g., a "thing shadow" or "device shadow" comprising a communication layer between the app 242a and the virtual co-location device 206 such as a JSON™ document that is utilized to store and retrieve current state information for the virtual co-location device 206 and/or the app 242a; which may be implemented via a "thing shadow" service that reads and writes status information to the file).

In addition to detecting movement or presence indicative of people in the meeting location/room 208, in some embodiments the proximity sensor 214c may also or alternatively comprise at least one of an RFID reader configured to detect an RFID tag and/or a NFC reader configured to read an NFC tag, wherein the proximity sensor 214c detects at least one of the RFID tag and/or the NFC tag and transmits a corresponding signal to the processor 212. In some embodiments, the RFID reader is physically and electrically coupled to a docking station of a local user (e.g., the local user device 202b). Upon insertion of the local user's laptop computer into the docking bay, the RFID reader recognizes an RFID tag embedded in the laptop computer and transmits a signal to the virtual co-location device 206 (e.g., via the proximity sensor 214c and/or the transceiver 218) indicating that the local user's laptop (e.g., the local user device 202b) is docked in the room and the local user is correspondingly likely to be present. In some embodiments, an NFC reader and NFC tag are used in place of an RFID reader and RFID tag.

Figure 3:
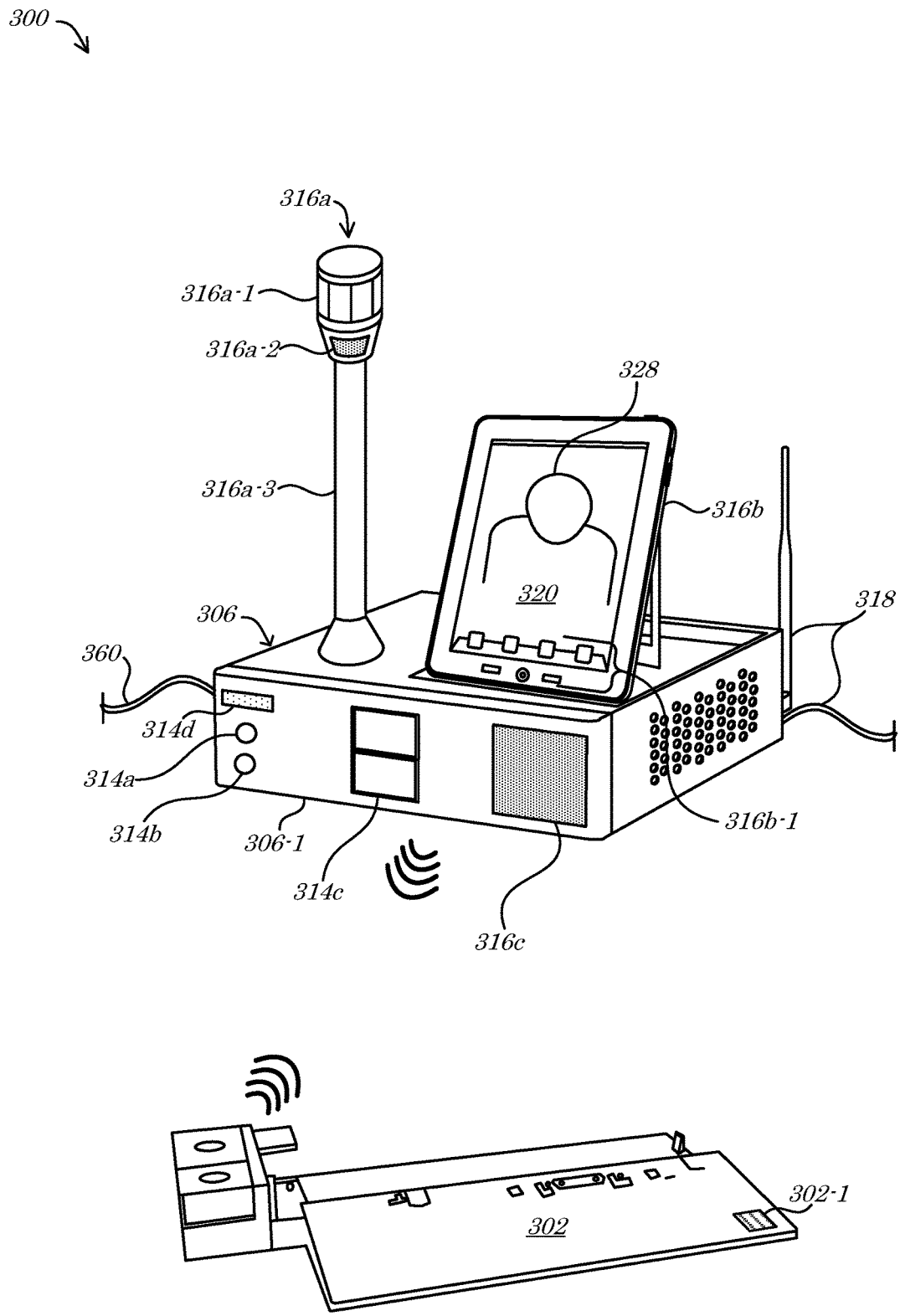
FIG. 3 is a perspective diagram of a system according to some embodiments.

Referring now to FIG. 3, a perspective diagram of a system 300 according to some embodiments is shown. In some embodiments, the system 300 may comprise a user device 302 (e.g., comprising an RFID reader (or tag) 302-1) and/or a virtual co-location device 306. The user device 302 may, in some embodiments, comprise a sensor, docking station, port replicator, plug, and/or receptacle, such as the laptop docking station depicted in FIG. 3. According to some embodiments, the user device 302 may comprise the RFID reader 302-1 that may, for example, detect a presence (e.g., a docking) of a laptop or other user electronic device (not shown for ease of illustration in FIG. 3; e.g., a user device 102a-n of FIG. 1 herein) in proximity thereto, e.g., due to a detection of a presence of a corresponding and/or compatible RFID tag coupled thereto (not shown). In some embodiments, the user device 302 may transmit and/or otherwise provide an indication of the presence of a user electronic device (and/or user; e.g., wearing a corresponding RFID tag) to the virtual co-location device 306. In such a manner, for example, and particularly in the case that multiple user devices 302 are disposed in a given meeting room, the virtual co-location device 306 may be made aware of any or all users (and/or associated devices) present in the meeting location.

According to some embodiments, the virtual co-location device 306 may be similar in configuration and/or functionality to the virtual co-location devices 106a-n, 206 of FIG. 1 and/or FIG. 2 herein. The virtual co-location device 306 may comprise, for example, a housing 306-1 that houses, mounts, retains, and/or otherwise couples (e.g., physically and/or magnetically) to a sound sensor 314a, a light sensor 314b, a proximity sensor 314c, a microphone 314d, a beacon 316a (e.g., comprising a light element 316a-1, a sounder element 316a-2, and/or a post element 316a-3), an I/O device 316b (e.g., comprising input objects 316b-1, such as buttons), a speaker 316c, and/or a network communication device 318 (e.g., an antenna and/or network cable connection). In some embodiments, the I/O device 316b may output an interface 320 and/or the virtual co-location device 306 may comprise and/or be powered by a power supply 360 (e.g., an A/C or D/C power cord appropriately coupled to receive power from any of a plurality of possible sources, such as an A/C wall outlet or receptacle at a meeting location).

In some embodiments, the beacon 316a may be provided to enable enhanced virtual co-location functionality. While the microphone 314d and the speaker 316c may be utilized to conduct a two-way teleconference between local (e.g., utilizing a device docked with and/or detected by the user device 302) and remote users (not shown), for example, the beacon 316a may be utilized to provide special alerts to local users regarding activity and/or input of one or more remote users. The post element 316a-3 of the beacon 316a may be attached to a top portion of the housing 306-1 at a proximal end and attached to the light element 316a-1 at a distal end, such that the light element 316a-1 stands out prominently among the components of the virtual co-location device 306. In such a manner, for example, a virtual "hand raise" trigger or command from a remote user may cause the beacon 316a (or the light element 316a-1 thereof) to emit light to capture the attention of local users. In some embodiments, multiple remote users may utilize the virtual co-location device 306 and the beacon 316a may accordingly be configured to output various different types of output, each type/configuration of output being representative of a different remote user. The light element 316a-1 may, for example, be configured to emit different colored light and/or be controlled by one or more remote users, and/or the beacon 316a may comprise the sounder 316a-2, that may be configured to emit different customized sounds or sound sequences assigned to different remote users.

According to some embodiments, the virtual co-location device 306 (and/or housing 306-1 thereof) may house any number, type, and/or configuration of local environmental sensors such as the sound sensor 314a, light sensor 314b, and/or proximity sensor 314c. The sensors 314a-c may be utilized, as described herein, to gather data regarding a status of the local environment (e.g., of a room) of the system 300 such as identifying sound, light, and/or proximity measurements that are indicative of activity (or lack of activity) in the environment. In some embodiments, specially-programmed and/or defined logic, rules, and/or thresholds may be utilized to identify one or more possible room statuses such as "Occupied", "Empty", or "Meeting in Progress". Signals indicating such statuses (and/or other statuses) may be sent to one or more remote devices (not shown in FIG. 3) via the network communication device 318. In some embodiments, input received back from one or more remote devices (e.g., in response to signals indicative of room status) may be output via the beacon 316a (e.g., in the case of a virtual "hand raise", a vote, etc.), the speaker 316c, and/or the I/O device 316b (e.g., via the interface 320). The interface 320 may display, for example, an icon, avatar, image, and/or video of one or more remote users 328 and/or the beacon 316a may be activated to draw attention to the virtual co-location device 306 (and accordingly, to the remote user displayed/depicted on the I/O device 316b). In some embodiments, the input objects 316b-1 of the I/O device 316b may be utilized by local users to interact with the virtual co-location device 306, such as to adjust display settings, set or manage sound, light, and/or proximity thresholds, set or manage time parameters, set or manage meeting attendance rules (e.g., security restrictions, options, and/or access settings—e.g., a passcode), and/or to activate meeting activities, such as to initiate a vote, select a vote type or style (e.g., voting rules), etc.

Figure 4A:
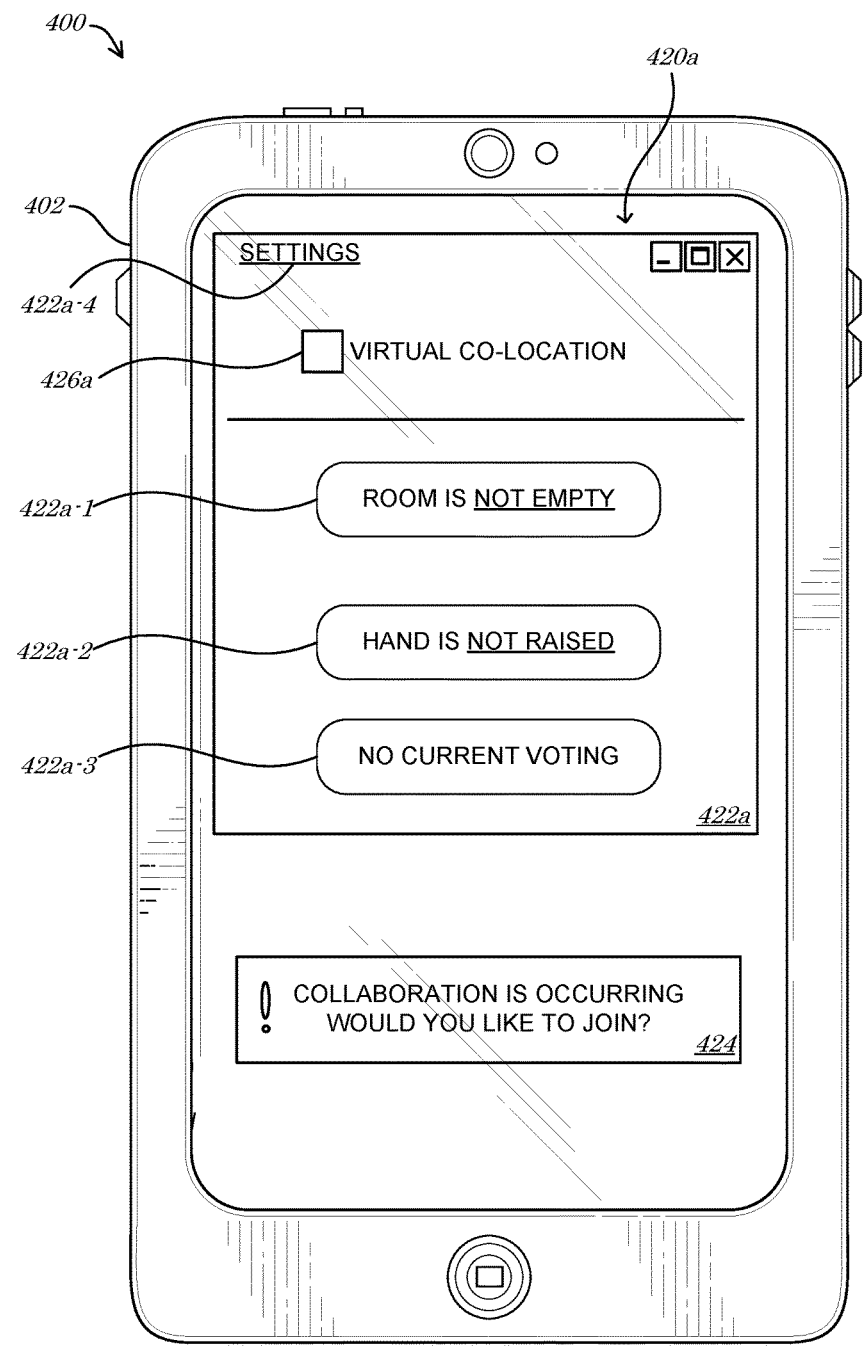
FIG. 4A and FIG. 4B are diagrams of a system providing example interfaces according to some embodiments.
Figure 4B:
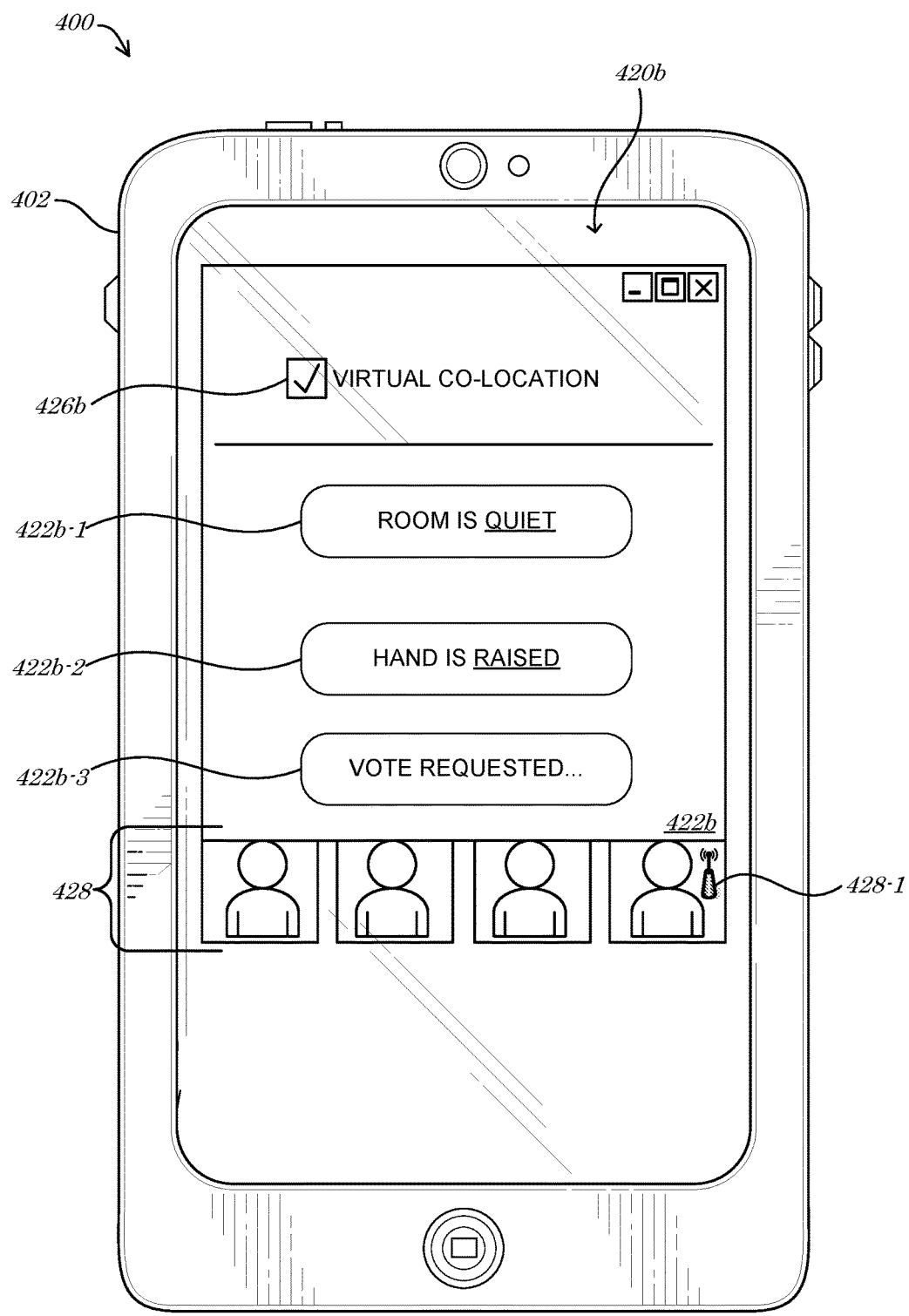

Turning now to FIG. 4A and FIG. 4B, diagrams of a system 400 depicting a user device 402 providing instances of an example interface 420*a-b* according to some embodiments are shown. In some embodiments, the interface 420*a-b* may comprise a web page, web form, database entry form, API, spreadsheet, table, and/or application or other GUI via which a user or other entity may enter data (e.g., provide or define input) to enable virtual co-location functionality, as described herein. The interface 420*a-b* may, for example, comprise a front-end of a virtual co-location client-side and/or mobile device application, program, and/or platform programmed and/or otherwise configured to execute, conduct, and/or facilitate the systemic method 500 of FIG. 5 herein, and/or portions thereof. In some embodiments, the interface 420*a-b* may be output via a computerized device, such as the user device 402, which may for example, be similar in configuration to one or more of the user devices 102*a-n*, 202*a-b*, 502 and/or the controller device 110, the server 210, 510, and/or the apparatus 610, of FIG. 1, FIG. 2, FIG. 5, and/or FIG. 6 herein.

According to some embodiments, the interface 420*a-b* may comprise one or more tabs and/or other segmented and/or logically-presented data forms and/or fields. In some embodiments, the interface 420*a-b* may be configured and/or organized to allow and/or facilitate entry of information defining a meeting participation action of a user, such as a virtual "hand raise", a vote, and/or other status or preference information. According to some embodiments, the interface 420*a-b* may comprise a menu page from which a user may select one or more options that initiate specific functionality of the virtual co-location application. As depicted in FIG. 4A, for example, a first version (or page or instance) of the interface 420*a* may comprise a first pop-up or window 422*a* (e.g., defining a first input and/or output mechanism) by providing a first area 422*a*-1 (e.g., one or more data output and/or entry mechanisms, tools, objects, and/or features) that provides an indication of activity taking place in a remote location (e.g., a meeting room, office, etc.). As depicted, for example, the first area 422*a*-1 may indicate that the "Room is NOT Empty"—e.g., based upon application of one or more stored rules and/or thresholds to sensor data from one or more sensors (not shown in FIG. 4A) disposed and/or coupled to sense activity and/or conditions in the room/location. According to some embodiments, a status of one or more remote sensors may be polled or queried to define the appropriate output for the first area 422*a*-1. According to some embodiments, a timer and/or time-based rule and/or threshold is included to better define the business hours that collaboration is most likely to take place in order to minimize false positive and/or false negative indications of collaboration.

In some embodiments, the first pop-up or window 422*a* may comprise a second area 422*a*-2 (e.g., one or more data output and/or entry mechanisms, tools, objects, and/or features) that provides an indication of whether or not a virtual "hand raise" is currently activated—e.g., "Hand is NOT Raised", as depicted. The first version (or page or instance) of the interface 420*a* and/or the second area 422*a*-2 of the first pop-up or window 422*a* may be utilized, for example, to communicate with and/or cause a remote beacon device (not shown in FIG. 4A; e.g., a component of a virtual co-location device as described herein) to output a specialized indication, such as a lighting of a beacon and/or sounding of an alert to make the virtual presence of the remote user known to individuals in the room/location. In some embodiments, a status of the beacon may be polled or queried to define the appropriate output for the second area 422*a*-2. According to some embodiments, the first pop-up or window 422*a* may comprise a third area 422*a*-3 (e.g., one or more data output and/or entry mechanisms, tools, objects, and/or features) that provides an indication of whether or not a vote or other collaborative information exchange is currently active or ongoing—e.g., "NO Current Voting", as depicted. Voting or other information (e.g., polls, surveys, etc.) may be defined by a meeting organizer or local (e.g., in-room) meeting participant by providing input to a virtual co-location device in the room/location, for example, and such information may be retrieved and/or otherwise output via the third area 422*a*-3. In some embodiments, the first pop-up or window 422*a* may comprise a fourth area 422*a*-4 (e.g., one or more data output and/or entry mechanisms, tools, objects, and/or features) that comprises a link to "Settings" for the software/application that generates the first version of the interface 420*a*. The "Settings" link of the fourth area 420*a*-4 may, for example, allow the user to select and/or define one of a subset of available rooms/locations to monitor and/or join (e.g., virtually join), one of a subset of available virtual co-location devices to utilize, settings for the virtual "hand raise" beacon (e.g., illumination intensity, color, blink or fade rate, alert sound, volume, etc.), invite participants, edit a user profile and/or information, such as security access credentials, and/or select and/or define other user-preferences and/or setting values. The "Settings" link of the fourth area 420*a*-4 may, when actuated or selected by the user, for example, initiate a sub-routine that enables the entry of various preference and/or settings information for the client-side virtual co-location application executed by the user device 402.

According to some embodiments, the first version (or page or instance) of the interface 420*a* may comprise a second pop-up or window 424 that may alert the user of the user device 402 to active and/or ongoing collaboration at the selected remote location. As depicted in FIG. 4A, for example, the indication of the "Room is NOT Empty" displayed in the first area 422*a*-1 of the first pop-up or window 422*a* may be indicative of above-threshold noise, light, and/or proximity sensor readings at the location and the second pop-up or window 424 may alert the user that the status of the location is indicative of active collaboration (e.g., a meeting in progress). In some embodiments, the second pop-up or window 424 may include the example text message and/or prompt "Collaboration is Occurring, Would you like to Join?" and/or may be accompanied by a tone, sound, flashing, and/or other alert output via the user device 402. According to some embodiments, the second pop-up or window 424 (and/or the first version of the interface 420*a*) may accept input indicating that the user desires to join the meeting—e.g., a user click on or selection of the second pop-up or window 424. In some embodiments, the first version of the interface 420*a* may comprise a virtual co-location status box 426*a* that indicates whether the user device 402 is currently in control of (and/or in communication with) a virtual co-location device at the meeting location. As depicted in FIG. 4A, as the user may be alerted to an active meeting via the second pop-up or window 424, but has not yet accepted the invitation to join, the current status of the user device 402 may be displayed by the virtual co-location status box 426*a* as not being connected/virtually co-located (e.g., no check in the box).

Referring to FIG. 4B, a second version (or page or instance) of the interface 420*b* may comprise a second version of the first pop or window 422*b* (e.g., defining a second input and/or output mechanism) by providing second versions of the first area 422*b*-1, the second area 422*b*-2, and/or the third area 422*b*-3. The second version (or page or instance) of the interface 420*b* may be utilized to participate remotely in a meeting in a virtual co-location manner that permits enhanced user participation, for example, and/or the second version (or page or instance) of the interface 420b may be provided in response to one or more inputs provided via a different version of the interface 420a. The second pop-up or window 424 of the first version of the interface 420a may, for example, upon a triggering and/or receipt of input from the user (e.g., a properly-positioned click of a mouse or other pointer) with respect to the second pop-up or window 424, trigger a call to and/or otherwise cause a provision, generation, and/or outputting of the second version of the interface 420b. In some embodiments, such a trigger may comprise an indication of a desire to join the meeting and may initiate and/or cause a communicative coupling of the user device 402 to one or more virtual co-location devices and/or associated servers (not shown in FIG. 4B). In some embodiments, a second version of the virtual co-location status box 426b may be updated and/or configured to indicate that the user device 402 (and any attendant user) is now connected to a virtual co-location device and participating in the meeting (e.g., via the depicted check in the box).

In some embodiments, the second version of the first area 422b-1 may be updated and/or configured to indicate that the "Room is Quiet", the second version of the second area 422b-2 may be updated and/or configured to indicate that the user's hand is virtually "Raised" (e.g., that a remote beacon device has been activated), and/or the second version of the third area 422b-3 may be updated and/or configured to indicate that there has been a "Vote Request" in the meeting. The second version of the second area 422b-2 may indicate the virtual "hand raise" in response to a selection of the second area 422a-2 by the user, for example, to trigger the "hand raise" once (or as) the meeting is joined. The user may, in some embodiments, trigger such a "hand raise" in response to the vote being called, as is indicated in the second version of the third area 422b-3. According to some embodiments, once the meeting is joined, the functionality of the first area 422a-1, 422b-1 may be altered (e.g., based on stored rules and/or logic). Once the meeting is joined and until the meeting is adjourned or people start to leave the room, for example, general presence or activity in the room may not be of interest (e.g., it is known that the room is occupied because the remote user is participating in the meeting, presumably by interacting with other attendees in the meeting location). Other dynamics of the room/meeting may be of more interest, however. As displayed in the second version of the first area 422b-1, for example, sensor levels (e.g., sound, as depicted) may be utilized to gauge an effectiveness of the actuated virtual "hand raise". In the example of FIG. 4B, for example, the virtual "hand raise" initiated by the user device 402 (e.g., as indicated by the second version of the second area 422b-2) may have been noticed by the local meeting participants, who have gone quiet, e.g., waiting for input from the remote user of the user device 402.

According to some embodiments, the second version of the interface 420b may comprise an attendee area 428 that may, as depicted, for example, display avatars, icons, images, and/or video (e.g., live video conferencing feed) representing one or more other attendees (remote and/or local) participating in the meeting. In some embodiments, the user may utilize the attendee area 428 to trigger private messages to selected attendees, retrieve data descriptive of selected attendees (e.g., profile information), and/or may be notified of certain attributes or events. As depicted in FIG. 4B, for example, one of the other attendees (remote or local to the meeting place) may have also triggered a virtual "hand raise" (or have voted, or voted in a particular manner), which may be indicated by an attendee notification icon 428-1.

While various components of the interface 420a-b have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

Figure 5:
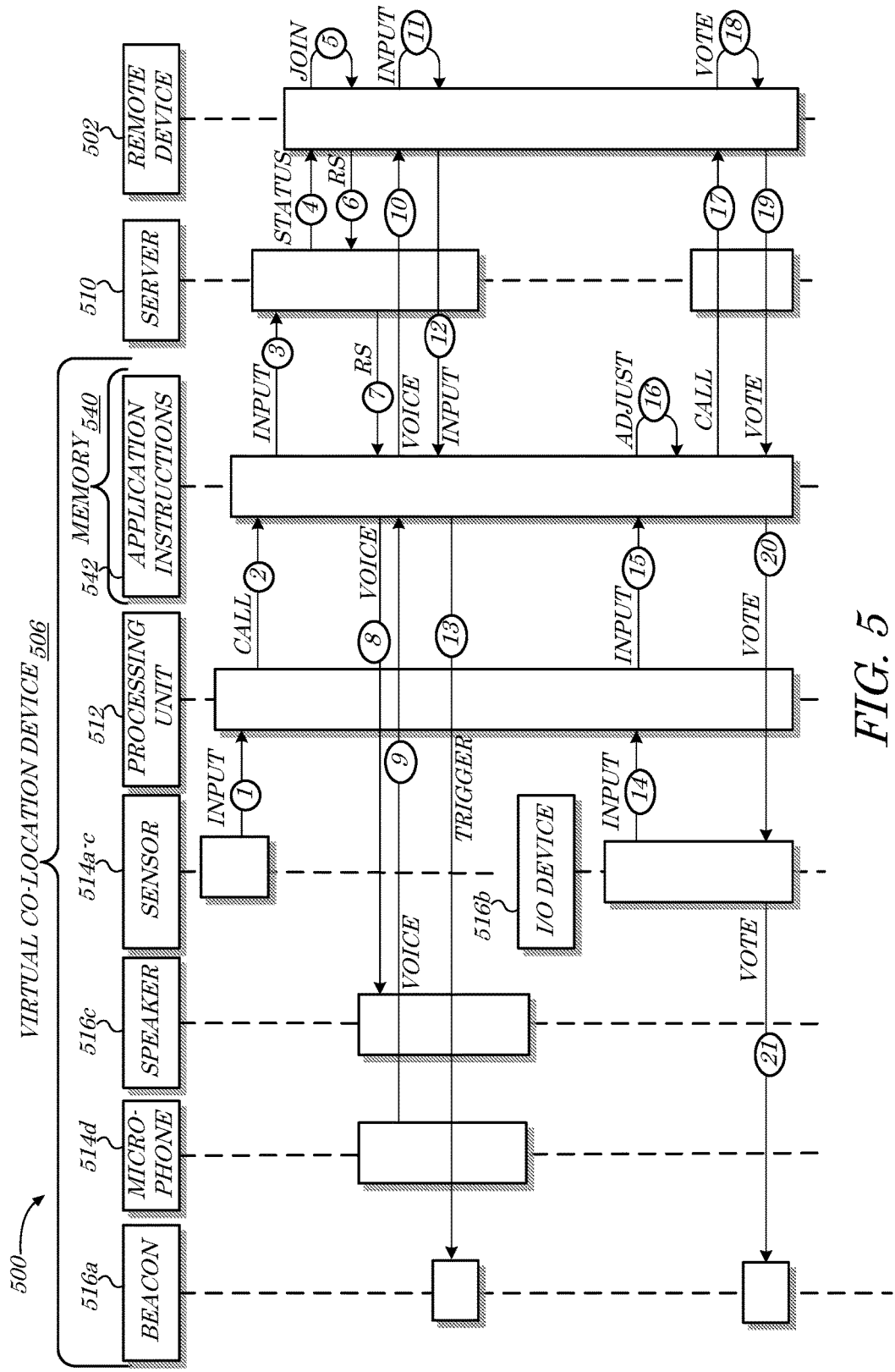
FIG. 5 is a systemic flow diagram of a method according to some embodiments.

Referring to FIG. 5, a systemic flow diagram of a method or process 500 according to some embodiments, is shown. In some embodiments, the process 500 may comprise and/or define a method for facilitating collaboration between a local user in a room and a remote user outside the room. The process 500 may, for example, be executed by various hardware and/or logical components via interactive communications, which may involve communications between any or all of a remote device 502, a virtual co-location device 506, and/or a server 510. According to some embodiments, the virtual co-location device 506 may comprise a processing unit 512, one or more sensors 514a-c, a microphone 514d, a beacon 514a, an I/O device 516b, a speaker 516c, and/or a memory 540 (e.g., storing application instructions 542). In some embodiments, the virtual co-location process 500 for facilitating collaboration may begin with providing, configuring, installing, powering-up, and/or connecting the virtual co-location device 506. In some embodiments, the process 500 may include providing the remote device 502 and/or software executed thereupon (e.g., an application downloadable from the server 510).

In some embodiments, the process 500 (e.g., for providing virtual co-location functionality and/or enhancements to the remote device 502) may comprise transmitting data descriptive of a sensor reading (e.g., recorded and/or sensed in a particular location, such as a meeting room) from at least sensor 514a-c (e.g., light, sound, proximity, and/or other sensors, such as pressure sensors, etc.) to the processing unit 512 (and accordingly the receipt of the data thereof) of the virtual co-location device 506, at "1". In some embodiments, the processing unit 512 may utilize the receipt of the sensor data to trigger a call or initiation of the application instructions 542, at "2". In some embodiments, the application instructions 542 may also or alternatively perform a polling loop, causing the application instructions 542 to be automatically waiting for receipt of the sensor data from the sensor 516a-c. According to some embodiments, upon receipt of the sensor data and/or a trigger or call by the processing device 512, the application instructions 542 may automatically cause a status update to be sent to the remote user device 502. The application instructions 542 may, for example, send the sensor data (and/or data processed as a result of the sensor data being sensed) as input to the server 510, at "3". The transmitting at "3" may, in some embodiments, result from an automatic activation of a hard-coded network address or remote identifier of the server 510 embedded within and/or accessible to the application instructions 542. In some embodiments, the server 510 may utilize the information received at "3" to structure and/or initiate a status update signal sent to the remote device 502, at "4".

According to some embodiments, at "5" the remote device 502 may utilize the status update information (e.g., sensor data, readings, and/or sensor data analysis results such as "Room Quiet" or "Meeting Started") received at "4" to initiate a joining of a meeting and/or collaboration at the location of the virtual co-location device 506. The remote device 502 may, for example, initiate and/or establish communications with and/or control over the virtual co-location device 506. In some embodiments, the remote device 502 may transmit a join request or response ("RS") to the server 510, at "6". The server 510 may forward or transmit the response received at "6" to the virtual co-location device 506 (and/or the application instructions 542 thereof) at "7". The transmission at "7" may, for example, comprise a response ("RS") to the provision of the data as input at "3". In such a manner, for example, the virtual co-location device 506 may automatically establish communications with and/or initiate an active communications session with the remote device 502, e.g., upon detection of activity in a room/location meeting specified criteria indicative of a collaboration.

The application instructions 542 may utilize the information received at "7", for example, to initiate two-way voice, image, and/or video communications between the remote device 502 and the virtual co-location device 506. The application instructions 542 may output, via a transmission to the speaker 516c at "8" for example, voice and/or other audible data from the remote device 502 (e.g., output into the room/location for the benefit of any local users/participants). In some embodiments, the application instructions 542 may wait to receive a user selection of the user-selectable object (or a subset of selectable objects). According to some embodiments, voice and/or other audible data from the room/location may be recorded by the microphone 514d, e.g., upon activation caused by the receipt of the join/voice data received at "7". The microphone 514d may, for example, transmit the recorded data to the application instructions 542, at "9". In some embodiments, the application instructions 542 may forward or transmit the recorded data to the remote device 502 (e.g., via the server 510), at "10". In such a manner, for example, communications of various desirable types and/or formats may be exchanged between the room/location (e.g., via the virtual co-location device 506) and the remote device 502.

In some embodiments, the virtual co-location device 506 may be utilized to effectuate a virtual "hand raising" to get the attention of local meting attendees. During a teleconference defined by the exchange of data at "7", "8", "9", and/or 37 10, for example, a remote user logged into a client-side (e.g., remote and/or mobile device) application executing on the remote device 502 and participating in ongoing collaboration with one or more workers in the room may desire to be heard and/or noticed. The remote user may cause the beacon 514a to be lit, for example, indicating that remote user would like to make a spoken comment. This mitigates or overcomes one of the difficulties of remote collaboration, as compared to in-person collaboration. With in-person collaboration, a person can raise their hand or use a variety of different body language postures to signal their desire to comment that are not available to the typical remote participant. With the remote device 502 operating in conjunction with the virtual co-location device 506, however, the remote user may remotely activate the beacon 514a by selecting, e.g., clicking on with a mouse, a "Raise Hand" soft button output via the remote device 502. This may be accomplished, in some embodiments, by the defining of remote user input at "11". At "12", the remote user input may be transmitted and/or forwarded to the application instructions 542 (e.g., via the server 510). This may change a "hand raised" status of the remote user in the "shadow".

The shadow may be updated in AWS (e.g., at the server 510) via an HTTP request and the server 510 (e.g., AWS) may notify the virtual co-location device 506 via MQTT (e.g., at "12"). According to some embodiments, the processing device 512, upon execution of the application instructions 542 and in response to the receiving of the remote user input at "12", may send a command or trigger to the beacon 516a, at "13". The trigger or command may cause various output via the beacon 516a. The beacon 516a (and/or another output device such as the I/O device 516b) may display the name, image, icon, avatar, and/or video of the remote user, for example, and/or may change the color of an emitted light to a color associated with (or assigned to) the remote user and/or cause a flashing or blinking output sequence. In some embodiments, the virtual co-location device 506 may also or alternatively activate the beacon 516a (and/or the speaker 516c) to provide an audio cue of the notification. By remotely activating the beacon 516a, the remote user can provide an effective indication that they would like to provide spoken commentary, e.g., even while the underlying teleconference is in progress.

In some embodiments, the beacon 516a is configured to display one of a variety of different colors or output one of a variety of different sounds or sound and/or light sequences. For example, if five (5) remote workers are participating in a project, each of the five (5) workers may be assigned a different color light, e.g., red, orange, yellow, green, and blue. In this fashion, activation of a predefined color of the beacon 516a indicates that a particular remote worker wishes to speak. In some embodiments, a First-In-First-Out (FIFO) queue is used to determine who speaks next (e.g., in which order the beacon 516a is sequentially illuminated and/or caused to otherwise output).

In some embodiments, "remote labelling" is a variation of virtual "hand raising". The purpose of remote labelling is to request the opportunity to speak, for example, with the remote user (via the remote device 502) selectively causing a green light to be displayed by the beacon 516a ("green card"). In essence, the remote user is labeling the collaboration to be in need of their assistance. If the remote user selectively causes a yellow light to be displayed by the beacon 516a ("yellow card"), that indicates to local users that the conversion is churning and needs to move on. If the remote user selectively causes a red light to be displayed by the beacon 516a ("red card"), that indicates to local users that the conversion has gone off topic and should be reined in.

In some embodiments, the virtual co-location device 506 may be utilized for effectuating and/or facilitating remote voting. According to some embodiments, a remote voting sequence may be initiated by a local user utilizing the virtual co-location device 506. Local user input may be received via the I/O device 516b, for example, and passed to the processing unit 512, at "14". The processing unit 512 may utilize the local user input to execute the application instructions 542 (or a portion thereof), at "15". In some embodiments, the application instructions 542 may utilize the local user input to set, define, modify, and/or adjust one or more settings of the virtual co-location device 506, at "16". The local user input may define or modify sensor thresholds or rules, for example, or may request an initiation of a voting sequence. According to some embodiments, the adjustment or request may be forwarded to the remote device 502 as a status update, request, or call, at "17". At "18", the remote user may utilize the remote device 502 to vote (e.g., provide voting input).

In some embodiments for example, the remote user may be logged into the client-side application executed on the remote device 502 and/or may be participating in ongoing collaboration with one or more workers in the room. Similar to virtual hand raising, in some embodiments, a local user may cause their name and configurable color to be displayed via the I/O device 516b (e.g., via the local user input at "14") and/or via beacon 516a. The purpose of displaying the local user name and color may, for example, be to enable the local user to call for a vote (e.g., at "15", "16", and/or "17"). In some embodiments, the remote users have the same capability to call for a vote as the local users by using the remote device 502. Using a control input panel and/or a software menu displayed on a display of the I/O device 516b, the local user selects the "Voting" menu by pressing a software-designated "check" button and selects the desired type of vote. In some embodiments, the type of voting selected from include "Fist of Five," "Planning Poker," "Fibonacci Numbers," or other known voting approaches.

The processor 512 of the virtual co-location device 506 may, for example, iterate over or through a list of users in the "shadow" that are currently marked as "remote" and set a "Vote Requested" flag to the type of vote requested and update the shadow on the server 510 (e.g., AWS) via MQTT, e.g., at "17". In some embodiments, the virtual co-location device 506 then enters a "waiting" mode displaying a waiting message on the I/O device 516b, indicating how many votes it is waiting for. On the remote device 502, a notification of the status change is received, at "17". If the current user is one of the remote users in the list and the "Vote Requested" field is filled in, a voting panel is displayed with the name of the type of the vote and appropriate choices for the vote. The remote user may, in some embodiments, click on the option of their choice to generate a vote, at "18". This updates a "Vote Value" flag in the "shadow" and updates the "shadow" in AWS (e.g., the server 510) via HTTP, e.g., at "19". According to some embodiments, once an option is selected, the vote is locked so that the vote cannot be recast. The virtual co-location device 506 may receive notification of the vote value changes, e.g., from the server 510 at "19", and iterate over the list of users. If more votes are outstanding, the I/O device 516b display is updated (e.g., at "20") with the current number of votes received. If all votes have been received, the beacon 516a may illuminate and/or flash (e.g., at "21") and the I/O device 516b is updated to display the names of the users who voted, their selected values, and/or the results of the voting. At any time while voting is in progress the local user can either cancel the vote by providing input via the I/O device 516b (e.g., via a "back button"), or close the vote and view the incomplete results via the I/O device 516b (e.g., via a "check button"). When a vote is cancelled, closed, or completed the client-side application executed by the remote device 502 may be alerted and may hide the voting panel.

Figure 6:
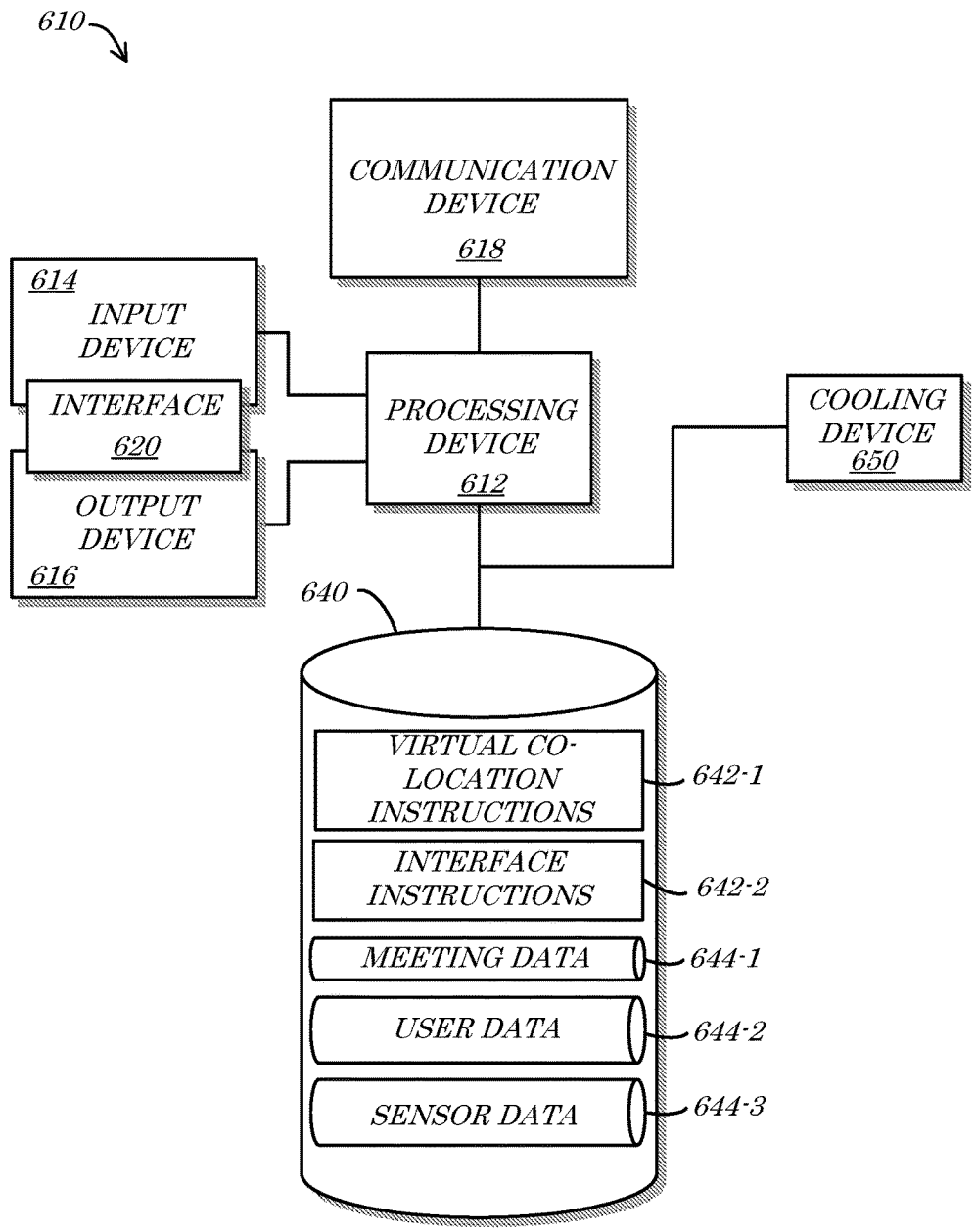
FIG. 6 is a block diagram of an apparatus according to some embodiments.
Figure 7A:
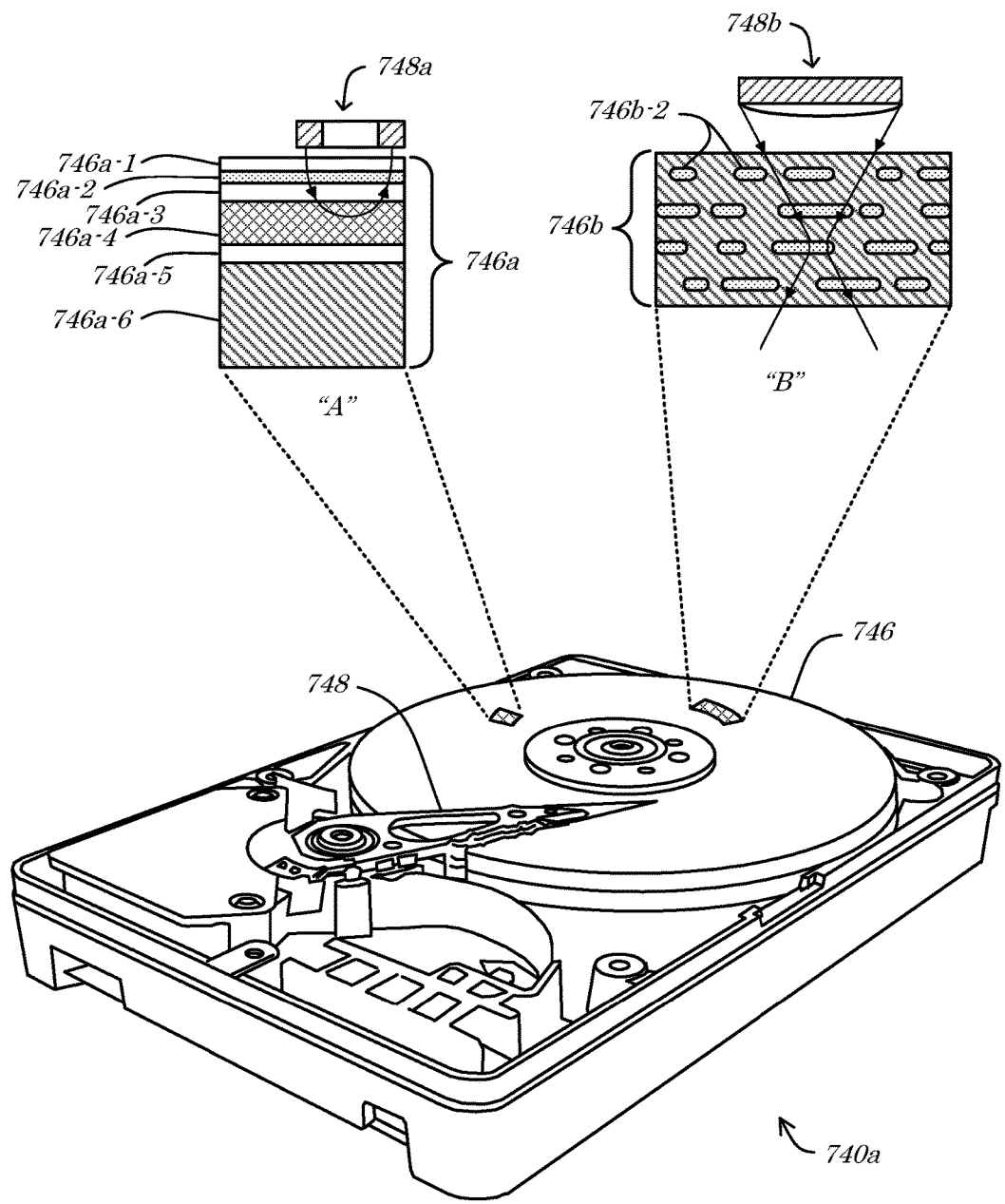
FIG. 7A, FIG. 7B, FIG. 7C, FIG. 7D, and FIG. 7E are perspective diagrams of exemplary data storage devices according to some embodiments.
Figure 7B:
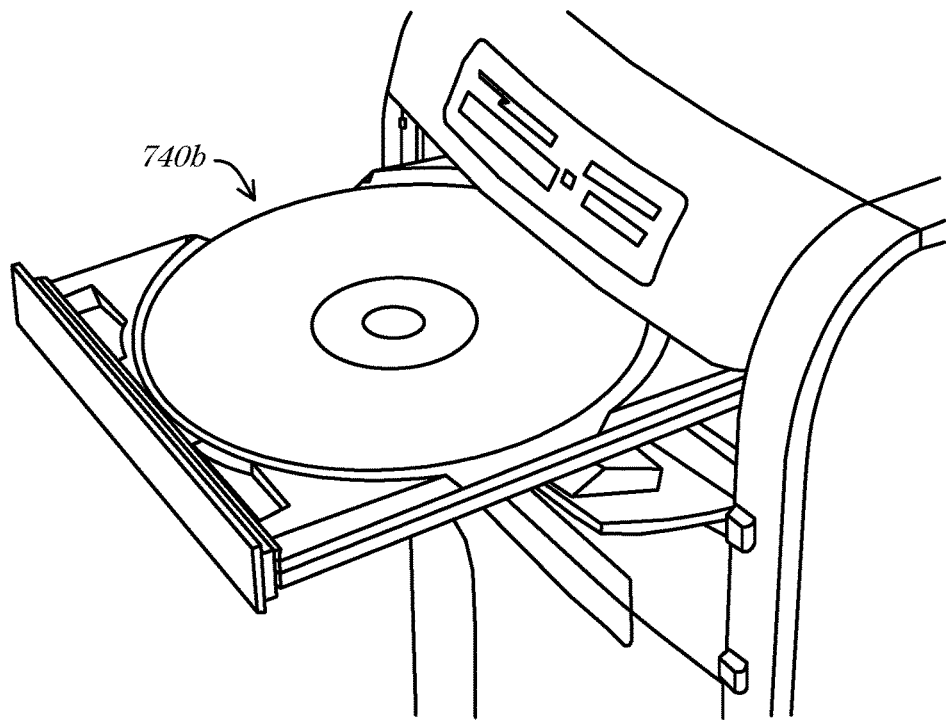
Figure 7C:
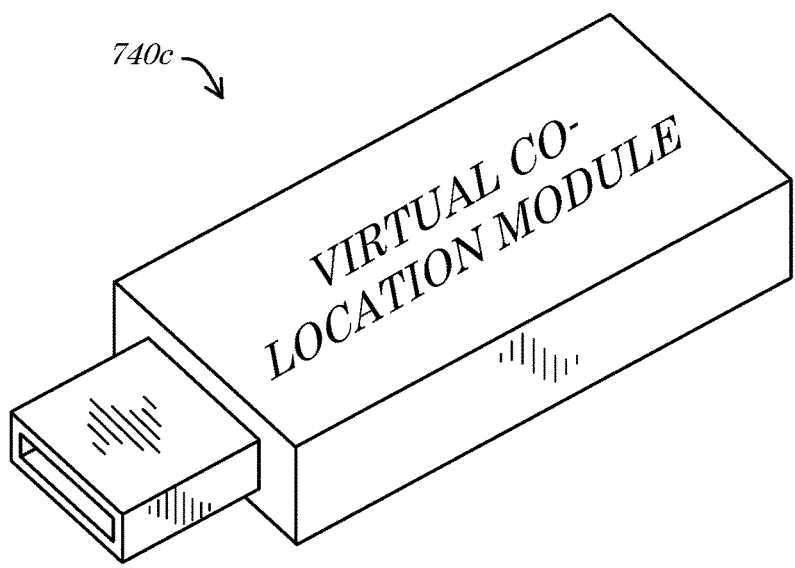
Figure 7D:
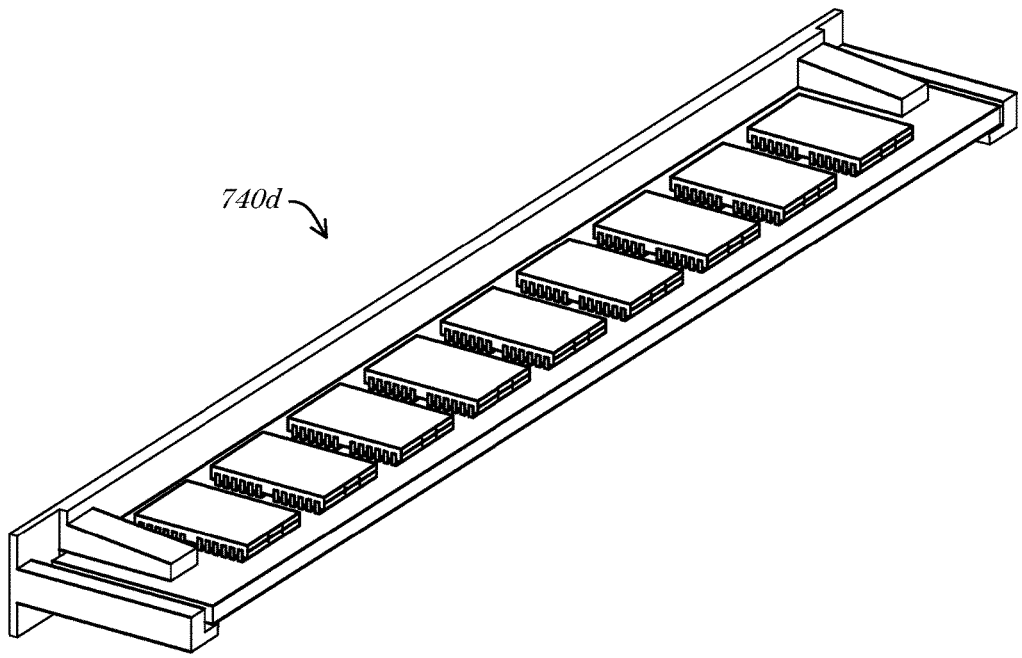
Figure 7E:
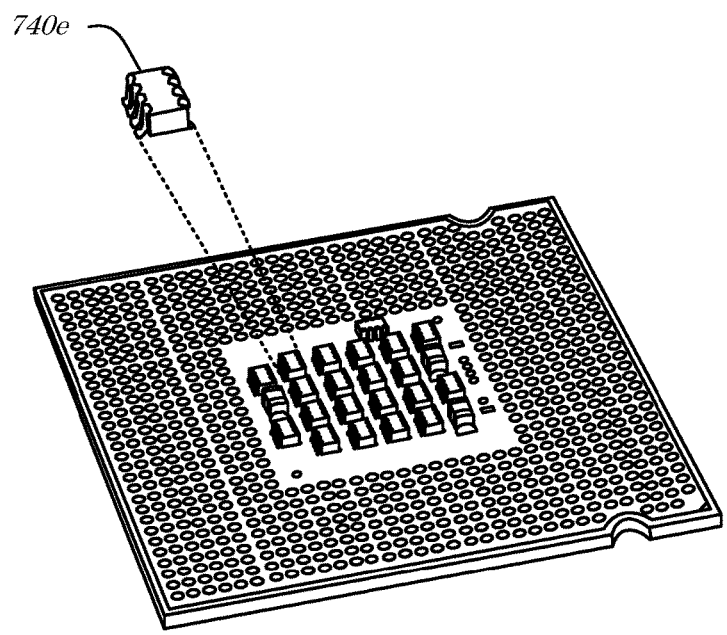

Turning to FIG. 6, a block diagram of an apparatus 610 according to some embodiments is shown. In some embodiments, the apparatus 610 may be similar in configuration and/or functionality to any of the controller device 110, the server 210, 510, the virtual co-location devices 106a-n, 206, 506, and/or the user devices 102a-n, 202a-b, 502 of FIG. 1, FIG. 2, and/or FIG. 5 herein. The apparatus 610 may, for example, execute, process, facilitate, and/or otherwise be associated with the systemic method 500 of FIG. 5 herein, and/or portions thereof. In some embodiments, the apparatus 610 may comprise a processing device 612, an input device 614, an output device 616, a communication device 618, an interface 620, a memory device 640 (storing various programs and/or instructions 642 and data 644), and/or a cooling device 650. According to some embodiments, any or all of the components 612, 614, 616, 618, 620, 640, 642, 644, 650 of the apparatus 610 may be similar in configuration and/or functionality to any similarly named and/or numbered components described herein. Fewer or more components 612, 614, 616, 618, 620, 640, 642, 644, 650 and/or various configurations of the components 612, 614, 616, 618, 620, 640, 642, 644, 650 be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E7501 chipset. In some embodiments, the processor 612 may comprise multiple inter-connected processors, microprocessors, and/or micro-engines. According to some embodiments, the processor 612 (and/or the apparatus 610 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 610 comprises a server such as a blade server or a virtual co-location device, necessary power may be supplied via a standard AC outlet, power strip, surge protector, and/or Uninterruptible Power Supply (UPS) device.

In some embodiments, the input device 614 and/or the output device 616 are communicatively coupled to the processor 612 (e.g., via wired and/or wireless connections and/or pathways) and they may generally comprise any types or configurations of input and output components and/or devices that are or become known, respectively. The input device 614 may comprise, for example, a keyboard that allows an operator of the apparatus 610 to interface with the apparatus 610 (e.g., by an administrator, such as to setup a virtual co-location system and/or by a user to remotely participate in a meeting having enhanced virtual co-location functionality, as described herein). In some embodiments, the input device 614 may comprise a sensor, such as sound, light, and/or proximity sensor configured to measure parameter values and report measured values via signals to the apparatus 610 and/or the processor 612. The output device 616 may, according to some embodiments, comprise a display screen and/or other practicable output component and/or device, such as a specialized virtual co-location beacon as described herein. The output device 616 may, for example, provide an interface (such as the interface 620 and/or the interface 420a-b of FIG. 4A and/or FIG. 4B herein) via which virtual co-location functionality is provided to a user (e.g., via a website and/or mobile application). According to some embodiments, the input device 614 and/or the output device 616 may comprise and/or be embodied in a single device such as a touch-screen monitor.

In some embodiments, the communication device 618 may comprise any type or configuration of communication device that is or becomes known or practicable. The communication device 618 may, for example, comprise a Network Interface Card (NIC), a telephonic device, a cellular network device, a router, a hub, a modem, and/or a communications port or cable. In some embodiments, the communication device 618 may be coupled to receive sensor data descriptive of a meeting room and/or forward such data to one or more other (e.g., remote) devices (not shown in FIG. 6). The communication device 618 may, for example, comprise a BLE and/or RF receiver device that acquires local meeting room data from one or more sensors (not separately depicted in FIG. 6) and/or a transmitter device that provides the data to a remote server (also not shown in FIG. 6). According to some embodiments, the communication device 618 may also or alternatively be coupled to the processor 612. In some embodiments, the communication device 618 may comprise an IR, RF, Bluetooth™, Near-Field Communication (NFC), and/or Wi-Fi® network device coupled to facilitate communications between the processor 612 and another device (such as a remote user device and/or a virtual co-location device, not separately shown in FIG. 6).

The memory device 640 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of virtual co-location instructions 642-1, interface instructions 642-2, meeting data 644-1, user data 644-2, and/or sensor data 644-3. In some embodiments, the virtual co-location instructions 642-1 and/or the interface instructions 642-2 may be utilized by the processor 612 to provide output information via the output device 616 and/or the communication device 618.

According to some embodiments, the virtual co-location instructions 642-1 may be operable to cause the processor 612 to process the meeting data 644-1, user data 644-2, and/or sensor data 644-3 in accordance with embodiments as described herein. Meeting data 644-1, user data 644-2, and/or sensor data 644-3 received via the input device 614 and/or the communication device 618 may, for example, be analyzed, sorted, filtered, decoded, decompressed, ranked, scored, plotted, and/or otherwise processed by the processor 612 in accordance with the virtual co-location instructions 642-1. In some embodiments, meeting data 644-1, user data 644-2, and/or sensor data 644-3 may be fed by the processor 612 through one or more mathematical and/or statistical formulas and/or models in accordance with the virtual co-location instructions 642-1 to provide enhanced virtual co-location functionality such as virtual "hand raise" and/or remote/virtual voting functionality via a remote device, as described herein.

In some embodiments, the interface instructions 642-2 may be operable to cause the processor 612 to process the meeting data 644-1, user data 644-2, and/or sensor data 644-3 in accordance with embodiments as described herein. Meeting data 644-1, user data 644-2, and/or sensor data 644-3 received via the input device 614 and/or the communication device 618 may, for example, be analyzed, sorted, filtered, decoded, decompressed, ranked, scored, plotted, and/or otherwise processed by the processor 612 in accordance with the interface instructions 642-2. In some embodiments, meeting data 644-1, user data 644-2, and/or sensor data 644-3 may be fed by the processor 612 through one or more mathematical and/or statistical formulas and/or models in accordance with the interface instructions 642-2 to provide an interface (such as the interface 620 and/or the interface 420a-b of FIG. 4A and/or FIG. 4B herein) via which input and/or output descriptive of remote meeting location status and/or meeting participation/actions may be provided, as described herein.

According to some embodiments, the apparatus 610 may comprise the cooling device 650. According to some embodiments, the cooling device 650 may be coupled (physically, thermally, and/or electrically) to the processor 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Referring to FIG. 7A, FIG. 7B, FIG. 7C, FIG. 7D, and FIG. 7E, perspective diagrams of exemplary data storage devices 740a-e according to some embodiments are shown. The data storage devices 740a-e may, for example, be utilized to store instructions and/or data such as the virtual co-location instructions 642-1, interface instructions 642-2, meeting data 644-1, user data 644-2, and/or sensor data 644-3, each of which is presented in reference to FIG. 6 herein. In some embodiments, instructions stored on the data storage devices 740a-e may, when executed by a processor, cause the implementation of and/or facilitate the systemic method 500 of FIG. 5 herein, and/or portions thereof.

According to some embodiments, the first data storage device 740a may comprise one or more various types of internal and/or external hard drives. The first data storage device 740a may, for example, comprise a data storage medium 746 that is read, interrogated, and/or otherwise communicatively coupled to and/or via a disk reading device 748. In some embodiments, the first data storage device 740a and/or the data storage medium 746 may be configured to store information utilizing one or more magnetic, inductive, and/or optical means (e.g., magnetic, inductive, and/or optical-encoding). The data storage medium 746, depicted as a first data storage medium 746a for example (e.g., breakout cross-section "A"), may comprise one or more of a polymer layer 746a-1, a magnetic data storage layer 746a-2, a non-magnetic layer 746a-3, a magnetic base layer 746a-4, a contact layer 746a-5, and/or a substrate layer 746a-6. According to some embodiments, a magnetic read head 748a may be coupled and/or disposed to read data from the magnetic data storage layer 746a-2.

In some embodiments, the data storage medium 746, depicted as a second data storage medium 746b for example (e.g., breakout cross-section "B"), may comprise a plurality of data points 746b-2 disposed with the second data storage medium 746b. The data points 746b-2 may, in some embodiments, be read and/or otherwise interfaced with via a laser-enabled read head 748b disposed and/or coupled to direct a laser beam through the second data storage medium 746b.

In some embodiments, the second data storage device 740b may comprise a CD, CD-ROM, DVD, Blu-Ray™ Disc, and/or other type of optically-encoded disk and/or other storage medium that is or becomes know or practicable. In some embodiments, the third data storage device

740c may comprise a USB keyfob, dongle, and/or other type of flash memory data storage device that is or becomes know or practicable. In some embodiments, the fourth data storage device 740d may comprise RAM of any type, quantity, and/or configuration that is or becomes practicable and/or desirable. In some embodiments, the fourth data storage device 740d may comprise an off-chip cache such as a Level 2 (L2) cache memory device. According to some embodiments, the fifth data storage device 740e may comprise an on-chip memory device such as a Level 1 (L1) cache memory device.

The data storage devices 740a-e may generally store program instructions, code, and/or modules that, when executed by a processing device cause a particular machine to function in accordance with one or more embodiments described herein. The data storage devices 740a-e depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media).

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

Some embodiments herein describe a virtual co-location system for facilitating collaboration between a local user (or users) in a room and a remote user (or users) outside the room. The virtual co-location system may include, for example, an IOT device. The IOT device may include a sound sensor configured to detect different sound levels in the room to detect an ambient sound level and produce an electronic sound signal representing the ambient sound level, a light sensor configured to detect different light levels in the room to detect an ambient light level and produce an electronic light signal representing the ambient light level, a beacon light, a speaker, a user control interface comprising a control input adjusted by the local user, the user control interface producing an electronic control signal representing a setting of a control device, and a local microprocessor for executing local collaboration software, wherein the local collaboration software causes the electronic sound signal to be received and stored, the electronic light signal to be received and stored, the electronic control signal to be received and stored, at least one of the electronic sound signal, a signal indicating an absence of sound at or beyond an audio threshold, and a signal indicating a presence of sound at or beyond the audio threshold to be transmitted the remote user, and at least one of the electronic light signal, a signal indicating an absence of light at or beyond an illumination threshold, and a signal indicating a presence of light at or beyond the illumination threshold to be transmitted to the remote user, wherein the local collaboration software receives a hand raise signal from the remote user and causes at least one of the beacon light to be illuminated and the speaker to produce a sound. The virtual co-location system may also or alternatively include a remote computer having a remote microprocessor for executing remote (e.g., client-side) collaboration software to receive and store at least one of the electronic sound signal, the signal indicating the absence of sound at or beyond an audio threshold, and the signal indicating the presence of sound at or beyond the audio threshold, and at least one of the electronic light signal, the signal indicating the absence of light at or beyond an illumination threshold, and the signal indicating a presence of light at or beyond the illumination threshold, and wherein the remote collaboration software transmits a virtual "hand raise" signal from the remote computer to the IOT device.

Some embodiments herein describe a virtual co-location method for facilitating collaboration between a local user (or users) in a room and a remote user (or users) outside the room. The virtual co-location method/process may include, for example, providing an IOT device. The IOT device may include a sound sensor configured to detect different sound levels in the room to detect an ambient sound level and produce an electronic sound signal representing the ambient sound level, a light sensor configured to detect different light levels in the room to detect an ambient light level and produce an electronic light signal representing the ambient light level, a beacon light, a speaker, a user control interface comprising a control input adjusted by the local user, the user control interface producing an electronic control signal representing a setting of a control device, and a local microprocessor for executing local collaboration software, wherein the local collaboration software causes the electronic sound signal to be received and stored, the electronic light signal to be received and stored, the electronic control signal to be received and stored, at least one of the electronic sound signal, a signal indicating an absence of sound at or beyond an audio threshold, and a signal indicating a presence of sound at or beyond the audio threshold to be transmitted the remote user, and at least one of the electronic light signal, a signal indicating an absence of light at or beyond an illumination threshold, and a signal indicating a presence of light at or beyond the illumination threshold to be transmitted to the remote user, wherein the local collaboration software receives a hand raise signal from the remote user and causes at least one of the beacon light to be illuminated and the speaker to produce a sound. The virtual co-location method may also or alternatively include providing a remote computer having a remote microprocessor for executing remote collaboration software to receive and store at least one of the electronic sound signal, the signal indicating the absence of sound at or beyond an audio threshold, and the signal indicating the presence of sound at or beyond the audio threshold, and at least one of the electronic light signal, the signal indicating the absence of light at or beyond an illumination threshold, and the signal indicating a presence of light at or beyond the illumination threshold, and wherein the remote collaboration software transmits a virtual "hand raise" signal from the remote computer to the IOT device.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A virtual co-location system for facilitating collaboration between a local user in a room and a remote user outside the room, comprising:
   an internet of things (IOT) device, comprising:
      a sound sensor configured to detect different sound levels in the room to detect an ambient sound level and produce an electronic sound signal representing the ambient sound level;
      a light sensor configured to detect different light levels in the room to detect an ambient light level and produce an electronic light signal representing the ambient light level;
      a beacon light;
      a speaker;
      a user control interface comprising a control input adjusted by the local user, the user control interface producing an electronic control signal representing a setting of a control device; and
      a local microprocessor for executing local collaboration software, wherein the local collaboration software causes:
         the electronic sound signal to be received and stored;
         the electronic light signal to be received and stored;
         the electronic control signal to be received and stored;
         at least one of the electronic sound signal, a signal indicating an absence of sound at or beyond an audio threshold, and a signal indicating a presence of sound at or beyond the audio threshold to be transmitted to the remote user; and
      at least one of the electronic light signal, a signal indicating an absence of light at or beyond an illumination threshold, and a signal indicating a presence of light at or beyond the illumination threshold to be transmitted to the remote user, wherein the local collaboration software receives a hand raise signal from the remote user and causes at least one of the beacon light to be illuminated and the speaker to produce a sound; and a remote computer having a remote microprocessor for executing remote collaboration software to receive and store:

at least one of the electronic sound signal, the signal indicating the absence of sound at or beyond the audio threshold, and the signal indicating the presence of sound at or beyond the audio threshold; and at least one of the electronic light signal, the signal indicating the absence of light at or beyond the illumination threshold, and the signal indicating a presence of light at or beyond the illumination threshold, and wherein the remote collaboration software transmits the hand raise signal from the remote computer to the IOT device.

2. The virtual co-location system of claim 1, further comprising:

a proximity sensor comprising at least one of an RFID reader configured to detect an RFID tag and a NFC reader configured to read an NFC tag, wherein the proximity sensor detects at least one of the RFID tag and the NFC tag and transmits a corresponding signal to the microprocessor.

3. The virtual co-location system of claim 1, wherein the control input is selected from one of a knob, a button, a switch, and a slide.

4. The virtual co-location system of claim 1, wherein the beacon light is color-coded to represent the remote user.

5. The virtual co-location system of claim 1, wherein the beacon light is illuminated upon a determination that the hand raise signal from the remote user is first out of a first-in first-out (FIFO) queue.

6. The virtual co-location system of claim 1, wherein the beacon light is illuminated with a color representing a message transmitted from the remote user.

7. The virtual co-location system of claim 1, wherein the local collaboration software receives and stores a vote signal from the remote user.

8. The virtual co-location system of claim 1, wherein the local collaboration software receives and stores a vote signal from the remote user, and wherein the local collaboration software causes a display communicatively coupled to the local microprocessor to display an indication of a voting outcome based at least in part on the vote signal from the remote user.

9. The virtual co-location system of claim 8, wherein the indication of the voting outcome is selected from a number in a first of five and a Fibonacci series.

10. A virtual co-location method for facilitating collaboration between a local user in a room and a remote user outside the room, comprising:

providing an internet of things (IOT) device, comprising:
a sound sensor configured to detect different sound levels in the room to detect an ambient sound level and produce an electronic sound signal representing the ambient sound level;
a light sensor configured to detect different light levels in the room to detect an ambient light level and produce an electronic light signal representing the ambient light level;
a beacon light;
a speaker;
a user control interface comprising a control input adjusted by the local user, the user control interface producing an electronic control signal representing a setting of a control device; and a local microprocessor for executing local collaboration software, wherein the local collaboration software causes:
the electronic sound signal to be received and stored;
the electronic light signal to be received and stored;
the electronic control signal to be received and stored;
at least one of the electronic sound signal, a signal indicating an absence of sound at or beyond an audio threshold, and a signal indicating a presence of sound at or beyond the audio threshold to be transmitted to the remote user; and at least one of the electronic light signal, a signal indicating an absence of light at or beyond an illumination threshold, and a signal indicating a presence of light at or beyond the illumination threshold to be transmitted to the remote user, wherein the local collaboration software receives a hand raise signal from the remote user and causes at least one of the beacon light to be illuminated and the speaker to produce a sound; and providing a remote computer having a remote microprocessor for executing remote collaboration software to receive and store:
at least one of the electronic sound signal, the signal indicating the absence of sound at or beyond the audio threshold, and the signal indicating the presence of sound at or beyond the audio threshold; and
at least one of the electronic light signal, the signal indicating the absence of light at or beyond the illumination threshold, and the signal indicating a presence of light at or beyond the illumination threshold, and wherein the remote collaboration software transmits the hand raise signal from the remote computer to the IOT device.

11. The virtual co-location system of claim 10, further comprising:

a proximity sensor comprising at least one of an RFID reader configured to detect an RFID tag and a NFC reader configured to read an NFC tag, wherein the proximity sensor detects at least one of the RFID tag and the NFC tag and transmits a corresponding signal to the microprocessor.

12. The virtual co-location system of claim 10, wherein the control input is selected from one of a knob, a button, a switch, and a slide.

13. The virtual co-location system of claim 10, wherein the beacon light is color-coded to represent the remote user.

14. The virtual co-location system of claim 10, wherein the beacon light is illuminated upon a determination that the hand raise signal from the remote user is first out of a first-in first-out (FIFO) queue.

15. The virtual co-location system of claim 10, wherein the beacon light is illuminated with a color representing a message transmitted from the remote user.

16. The virtual co-location system of claim 10, wherein the local collaboration software receives and stores a vote signal from the remote user.

17. The virtual co-location system of claim 10, wherein the local collaboration software receives and stores a vote signal from the remote user, and wherein the local collaboration software causes a display communicatively coupled to the local microprocessor to display an indication of a voting outcome based at least in part on the vote signal from the remote user.

18. The virtual co-location system of claim 17, wherein the indication of the voting outcome is selected from a number in a first of five and a Fibonacci series.

* * * * *